US010718055B2

(12) United States Patent
Ren et al.

(10) Patent No.: US 10,718,055 B2
(45) Date of Patent: Jul. 21, 2020

(54) CARBON DIOXIDE CAPTURE AND STORAGE ELECTROLYTIC METHODS

(71) Applicant: THE REGENTS OF THE UNIVERSITY OF COLORADO, A BODY CORPORATE, Denver, CO (US)

(72) Inventors: Zhiyong Ren, Superior, CO (US); Lu Lu, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 630 days.

(21) Appl. No.: 15/182,928

(22) Filed: Jun. 15, 2016

(65) Prior Publication Data

US 2016/0362800 A1    Dec. 15, 2016

Related U.S. Application Data

(60) Provisional application No. 62/175,938, filed on Jun. 15, 2015.

(51) Int. Cl.
| | | |
|---|---|---|
| C25B 1/18 | (2006.01) | |
| C25B 11/04 | (2006.01) | |
| C25B 13/02 | (2006.01) | |
| C25B 9/08 | (2006.01) | |
| B01D 53/62 | (2006.01) | |
| B01D 53/32 | (2006.01) | |

(Continued)

(52) U.S. Cl.
CPC ............. *C25B 1/18* (2013.01); *B01D 53/326* (2013.01); *B01D 53/62* (2013.01); *C02F 3/005* (2013.01); *C25B 9/08* (2013.01); *C25B 11/0405* (2013.01); *C25B 11/0442* (2013.01); *C25B 13/02* (2013.01); *B01D 2251/404* (2013.01); *B01D 2257/504* (2013.01); *C02F 2103/08* (2013.01); *Y02C 10/04* (2013.01); *Y02P 20/152* (2015.11); *Y02W 10/33* (2015.05); *Y02W 10/37* (2015.05)

(58) Field of Classification Search
None
See application file for complete search history.

(56) References Cited

U.S. PATENT DOCUMENTS

| | | | |
|---|---|---|---|
| 7,491,453 B2 | 2/2009 | Logan et al. | |
| 7,993,511 B2 * | 8/2011 | Gilliam | .......... C01B 32/60 204/252 |
| 2007/0259216 A1 | 11/2007 | Logan et al. | |

(Continued)

FOREIGN PATENT DOCUMENTS

WO        2007140544 A1    12/2007

OTHER PUBLICATIONS

Escapa, et al., "Performance of a Continuous Flow Microbial Electrolysis Cell (MEC) Fed with Domestic Wastewater", Bioresource Technology, vol. 117, 2012, pp. 55-62.

(Continued)

*Primary Examiner* — Arun S Phasge
(74) *Attorney, Agent, or Firm* — Saul Ewing Arnstein & Lehr LLP; Kathryn Doyle; Domingos J. Silva

(57) ABSTRACT

The present invention relates to the unexpected discovery of systems for capturing carbon dioxide and producing hydrogen gas. In certain embodiments, the system treats wastewater. In certain embodiments, the system captures and sequesters $CO_2$ as carbonate salts.

19 Claims, 23 Drawing Sheets

(51) Int. Cl.
*C02F 3/00* (2006.01)
*C02F 103/08* (2006.01)

(56) References Cited

U.S. PATENT DOCUMENTS

| | | |
|---|---|---|
| 2010/0092804 A1 | 4/2010 | Borole et al. |
| 2011/0030586 A1 | 2/2011 | Constantz et al. |
| 2011/0042230 A1 | 2/2011 | Gilliam et al. |
| 2013/0186775 A1 | 7/2013 | Rieke et al. |
| 2013/0299400 A1 | 11/2013 | Silver et al. |
| 2014/0151240 A1 | 6/2014 | Bedell et al. |

OTHER PUBLICATIONS

House, et al., "Electrochemical Acceleration of Chemical Weathering as an Energetically Feasible Approach to Mitigating Anthropogenic Climate Change", Environ. Sci. Technol., vol. 41, No. 24, 2007, pp. 8464-8470.

Rao, et al., "Direct Electrolytic Dissolution of Silicate Minerals for Air CO2 Mitigation and Carbon-Negative H2 Production", PNAS, vol. 110, No. 25, 2013, pp. 10095-10100.

Rao, "Electrochemical Splitting of Calcium Carbonate to Increase Solution Alkalinity: Implications for Mitigation of Carbon Dioxide and Ocean Acidity", Environ. Sci. Technol., vol. 42, No. 23, 2008, pp. 8935-8940.

Wang, et al., "Sequestration of CO2 Discharged from Anode by Algal Cathode in Microbial Carbon Capture Cells (MCCs)", Biosens. Bioelect., vol. 25, No. 12, 2010, pp. 2639-2343.

\* cited by examiner

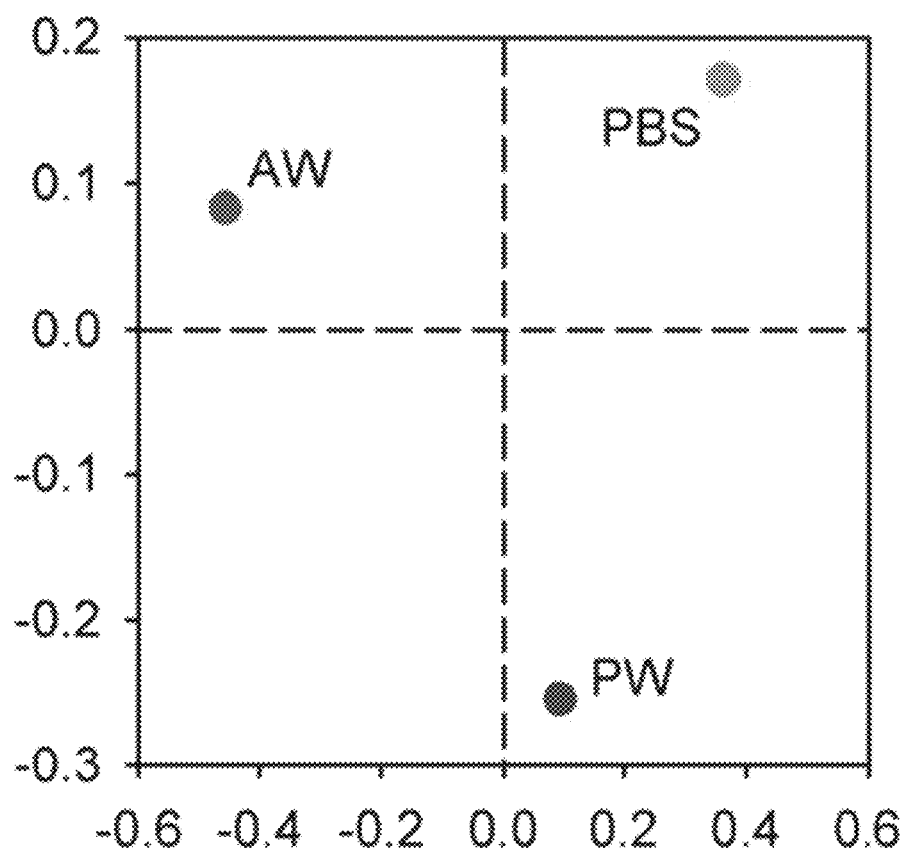

CARBON DIOXIDE CAPTURE AND STORAGE ELECTROLYTIC METHODS

CROSS-REFERENCE TO RELATED APPLICATIONS

The present application claims priority under 35 U.S.C. § 119(e) to U.S. Provisional Patent Application No. 62/175,938, filed Jun. 15, 2015, which is incorporated herein by reference in its entirety.

STATEMENT REGARDING FEDERALLY SPONSORED RESEARCH OR DEVELOPMENT

This invention was made with government support under grant numbers CBET-1235848 and IIP-1445084 awarded by the U.S. National Science Foundation. The government has certain rights in the invention.

BACKGROUND OF THE INVENTION

Wastewater treatment is essential for preventing disease and protecting the environment, but current treatment processes are energy intensive and emit greenhouse gas (GHG) due to fossil fuel use and organic degradation. Every year, approximately 12 trillion gallons of municipal wastewater are treated by publicly owned treatment works in the U.S., and this consumes about 15 GW, or 3% of the total electricity produced in the U.S. In the meantime, approximately $0.73 \times 10^9$ ton (Gt) of carbon dioxide-eq/yr emission is attributed to the degradation of organics in wastewater, equivalent to nearly 1.5% of the GHG emissions of 49 Gt carbon dioxide-eq/yr. These numbers are even larger when industrial and agricultural wastewater treatment industries are included. Great progress has been made to increase energy efficiency and recover renewable energy from wastewater using technologies such as anaerobic digestion and bioelectrochemical systems, because the chemical energy content embedded in wastewater is estimated to be multiple times that required to treat the wastewater. However, these methods reduce only fossil fuel consumption and its associated carbon emission.

Point-source carbon dioxide ($CO_2$) mitigation, in particular carbon capture and storage (CCS), has been a main strategy for reducing industrial and energy-related $CO_2$ emissions (e.g., power plants, cement and petrochemical industries, and so forth), which account for approximately 60% total $CO_2$ emission due to fossil-fuel use. Conventional CCS consists of energy-intensive and costly $CO_2$ separation, purification, compression, transportation, and injection underground. A power plant equipped with CCS incurs at least a 10-40% energy penalty primarily due to the high-energy-demand solvent/sorbent regeneration process. Emerging membrane technologies minimize regeneration process and reduce environmental impacts, but system scale-up has been a challenge. Related CCS technologies have been explored to capture much more dilute $CO_2$ from the atmosphere, either in combination with biomass combustion/energy production, bioelectrochemical carbon capture and storage (BECCS) or using base solvent absorption or solid sorbent adsorption. Generally, these are even more energy intensive and costly than point-source $CO_2$ mitigation. However, a variety of potentially cheaper and high capacity air $CO_2$ removal strategies have been proposed. For example, algae were used in bioelectrochemical systems to capture $CO_2$ discharged from the anode in a microbial carbon capture cell, and recent studies found that the acids normally produced in the anolyte during the electrolysis of saline water can be reacted with carbonate or silicate minerals to generate strongly alkaline, $CO_2$-absorptive solutions. This in effect greatly accelerates mineral weathering. When powered by non-fossil energy, the system is strongly $CO_2$-emissions negative. However, the process is energy consumptive, with non-optimized, experimental systems using 426 to 481 kJ per mole of $CO_2$ consumed and stored. When seawater or saline ground water is used, the geographic location of the operation is limited, and toxic $Cl_2$ and halogenated organic compounds can be generated during electrolysis, posing environmental and health risks.

Despite the progress, most current $CO_2$ capture studies have been conducted on either pure or highly concentrated $CO_2$, which inherently limits the technology to $CO_2$ generated from point sources such as power plants or refineries. It also limits the applicability of $CO_2$ capture to new emissions without tackling the over 1,000 Giga tons of cumulative anthropogenic $CO_2$ emissions since 1970, which has already posed great threat to the climate. It is estimated that even if 90% of $CO_2$ emitted from 90% of the point sources is captured, 50% of the total anthropogenic $CO_2$ emission will still be unaccounted for. This stresses the importance of ambient $CO_2$ capture in meeting the grand carbon management goals. Currently, feasible ambient $CO_2$ capture technologies are hampered by the high energy requirements of the process, and the lack of safe carbon storage options.

There is a need in the art for novel inexpensive and safe methods of capturing carbon dioxide. Additionally, there is a need in the art for novel methods of wastewater treatment and processing, especially methods that are able to transform and capture latent chemical energy contained within the wastewater. The present invention addresses these unmet needs.

BRIEF SUMMARY OF THE INVENTION

In one aspect, the invention provides an electrolytic system. In another aspect, the invention provides a method of sequestering at least a portion of carbon dioxide ($CO_2$) from a $CO_2$-comprising gas. In yet another aspect, the invention provides a method of removing at least a portion of the dissolved or particulate organic matter of an aqueous electrolyte.

In certain embodiments, the electrolytic system comprises an anodic cell comprising an anode and an anolyte, wherein the anode is at least partially immersed in the anolyte. In other embodiments, the electrolytic system provides a cathodic cell comprising a cathode and a catholyte, wherein the cathode is at least partially immersed in the catholyte. In yet other embodiments, the electrolytic system provides a porous barrier that physically separates the anodic cell and the cathodic cell, wherein the anodic cell and the cathodic cell are in fluidic communication through the porous barrier. In yet other embodiments, the electrolytic system provides an external power source that is connected to the anode and the cathode through electrical conduits, wherein the external power source allows for the application of an external voltage between the anode and the cathode. In yet other embodiments, the electrolytic system provides a first gas inlet to the cathodic cell.

In certain embodiments, the first gas inlet allows for feeding a $CO_2$-comprising gas into the cathodic cell. In other embodiments, the first gas inlet allows for collecting a gas generated in the cathodic cell. In yet other embodiments, the anolyte comprises an aqueous electrolyte. In yet other embodiments, the anolyte further comprises a salt of a given cation or a solid material that releases a given cation when reacted with a weak acid. In yet other embodiments, the given cation is capable of forming a sparingly soluble or insoluble salt with at least one selected from the group consisting of bicarbonate and carbonate.

In certain embodiments, the anode is at least partially grown, coated or impregnated with an exoelectrogen biofilm. In other embodiments, the exoelectrogen comprises a *Geobacter* bacterium or other microbium capable of extracellular electron transfer. In yet other embodiments, the aqueous electrolyte in the anolyte comprises a dissolved or particulate organic compound or another biodegradable substrate. In yet other embodiments, the aqueous electrolyte in the anolyte comprises wastewater.

In certain embodiments, the salt of the given cation is less soluble in the anolyte in the absence of the external voltage than in the presence of the external voltage. In other embodiments, the given cation is a polyvalent cation, such as but not limited to an alkaline earth cation. In yet other embodiments, the given cation comprises $Ca^{2+}$, $Mg^{2+}$, or $Sr^{2+}$. In yet other embodiments, the salt of the given cation comprises $CaSiO_3$. In yet other embodiments, the salt of the given cation is derived from a waste material or a mineral added to the anolyte. In yet other embodiments, the waste material or mineral comprises fly ash or olivine.

In certain embodiments, the external voltage ranges from about 0.1 V to about 3.5 V. In other embodiments, the external voltage ranges from about 0.2 to 0.8 V. In yet other embodiments, the anode is at least partially grown, coated or impregnated with an exoelectrogen biofilm, and the external voltage ranges from about 0.2 to 0.8 V.

In certain embodiments, application of the external voltage generates hydrogen gas in the cathode. In other embodiments, hydrogen gas is generated in the cathode. In yet other embodiments, the cathodic cell allows for capture and collection of at least a portion of the hydrogen gas generated therein. In yet other embodiments, application of the external voltage allows for capture of carbon dioxide in the form of a carbonate or bicarbonate salt in the catholyte. In yet other embodiments, the at least a fraction of the captured carbon dioxide is derived from the $CO_2$-comprising gas fed into the cathodic cell. In yet other embodiments, application of the external voltage does not form chlorine ($Cl_2$) in the anode.

In certain embodiments, an insoluble carbonate or bicarbonate of the given cation is formed in the catholyte. In other embodiments, the insoluble carbonate or bicarbonate of the given cation is isolated in purity equal to or greater than 97%.

In certain embodiments, the first inlet is in fluidic communication with a column comprising an anionic exchange resin. In other embodiments, before being fed into the cathodic cell, the $CO_2$-comprising gas is contacted with a column comprising an anionic exchange resin, wherein the column is in fluidic communication with the first inlet. In yet other embodiments, the porous barrier comprises a cation exchange membrane, ion exchange membrane, or other physical porous separator.

In certain embodiments, the method comprises feeding the $CO_2$-comprising gas into the cathodic cell of the system of the invention through the first gas inlet. In other embodiments, the method comprises applying the external voltage to the system. In yet other embodiments, at least a portion of the $CO_2$ is captured in the form of a carbonate or bicarbonate salt in the catholyte.

In certain embodiments, the method comprises adding the aqueous electrolyte to the anolyte of the system of the invention. In other embodiments, the method comprises feeding a $CO_2$-comprising gas into the cathodic cell of the system through the first gas inlet. In yet other embodiments, the method comprises applying the external voltage to the system. In yet other embodiments, at least a portion of the dissolved or particulate organic matter of the aqueous electrolyte is consumed in the anolyte.

BRIEF DESCRIPTION OF THE DRAWINGS

The following detailed description of specific embodiments of the invention will be better understood when read in conjunction with the appended drawings. For the purpose of illustrating the invention, there are shown in the drawings specific embodiments. It should be understood, however, that the invention is not limited to the precise arrangements and instrumentalities of the embodiments shown in the drawings.

FIG. 4A depicts the visual difference between suspended $CaCO_3$ colloid found in the catholyte in an active reactor and a clear catholyte control. FIG. 4B depicts white $CaCO_3$ deposits on the wall of a cathode chamber, and FIG. 4C depicts white $CaCO_3$ deposits on the membrane surface facing the cathode.

FIG. 5C is a plot reporting the Weighted Fast UniFrac Principal Coordinates Analysis (PCoA) of the different bacterial communities on the basis of phylogenetic lineages that samples contain. X-axis: P1 Percent variation explained 77.63%. Y-axis: P1 Percent variation explained 22.37%. Certain non-limiting bacteria are illustrated.

DETAILED DESCRIPTION OF THE INVENTION

Figure 1:
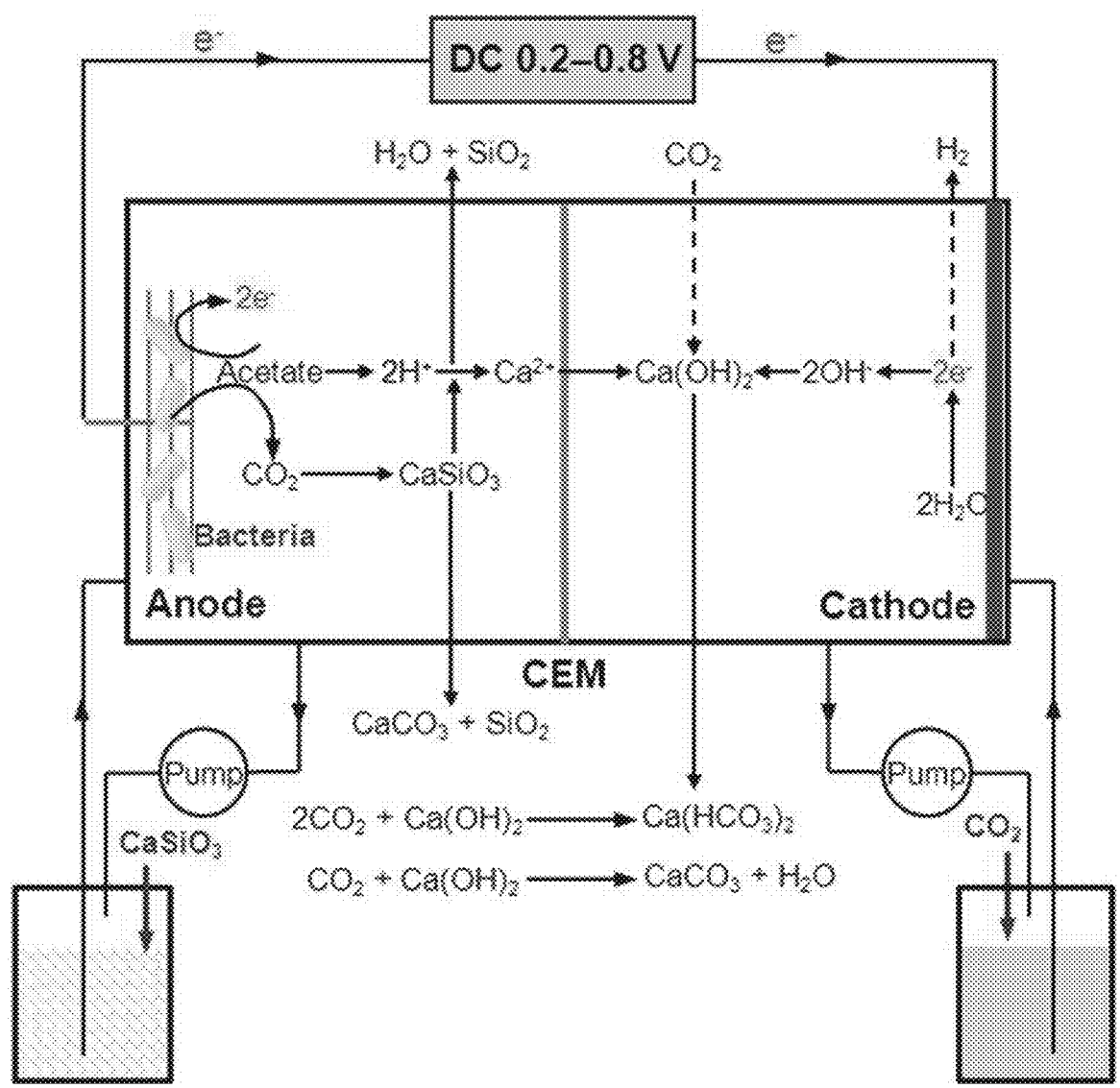
FIG. 1 depicts a schematic of the direct microbial electrolytic carbon capture (MECC) process for in situ carbon sequestration and $H_2$ production during wastewater treatment. Wastewater was used as an electrolyte for microbially assisted electrolytic production of $H_2$ and $OH^-$ at the cathode and protons (acidity) at the anode. This acidity dissolved silicate and liberated metal ions that balanced the $OH^-$, producing metal hydroxide, which spontaneously transformed $CO_2$ in situ into metal (bi)carbonate.

The present invention relates to the unexpected discovery of electrolytic systems for capturing carbon dioxide ($CO_2$) and producing hydrogen gas ($H_2$). In certain embodiments, the systems of the invention use wastewater as an electrolyte. In other embodiments, the systems of the invention use wastewater, which acts as an energy source and further captures $CO_2$.

In one aspect, as illustrated herein, the invention provides a microbial electrolytic carbon capture (MECC) process, which treats wastewater. In certain embodiments, the wastewater acts as both an electrolyte and as a process energy source to dissolve base minerals and capture and transform $CO_2$ in situ, while also generating $H_2$ as renewable energy. These systems exploit, via microbial oxidation, the chemical energy contained in wastewater to efficiently effect mineral dissolution, alkalinity production and $CO_2$ removal, in a net carbon-negative and net energy-positive process.

As exemplified herein, $CO_2$ was captured and transformed into stable metal carbonate and bicarbonate, which can be harvested and used on site as alkalinity compensation for nitrification and digestion, for improving activated sludge settling properties, and/or for environmental uses. In certain embodiments, electrochemically active bacteria (EAB) or exoelectrogens on the anode can oxidize organic substances in wastewater to produce electrons, protons (usually one proton for every electron) and $CO_2$. Electrons can then be accepted by the anode and transferred through an external circuit to the cathode, where they reduce water to produce $H_2$ and $OH^-$. Abundant and relatively inexpensive silicate minerals can be exposed to and react with the $H^+$-rich anolyte in situ to liberate metal ions and silica or other silicon compounds. Metal ions can then migrate through a cation exchange membrane (CEM) to the cathode chamber to form metal hydroxide, leading to spontaneous $CO_2$ capture and transformation into carbonate or bicarbonate. In certain embodiments, the process not only fixes the $CO_2$ derived from wastewater degradation, but also captures additional $CO_2$. In other embodiments, a small external energy input (0.2-0.8 V) is used to overcome the thermodynamic barrier of $H_2$ evolution, which is lower than that typically used to electrolyze water, 1.8-2.0 V; the energy gap is supplied at least in part by chemical energy stored in the wastewater organics. Because the anode accepts electrons from microbial organic degradation instead of electrolyte ions, generation of toxic chlorine-containing compounds, such as $Cl_2$, HCl, $ClO^-$, and $ClO_3^-$, is avoided. As demonstrated herein, proof-of-concept experiments, characterizing wastewater organic degradation, ion species transformation, and $H_2$ production, were performed using both artificial wastewater (AW) and real wastewater-produced water (PW) from shale gas well as electrolytes and solvents. The carbon balance and energy balance were characterized, and a preliminary economic analysis was conducted.

In another aspect, the invention is not only capable of capturing concentrated $CO_2$ from point sources, but can also be directly used for ambient $CO_2$ capture and storage. The bioelectrochemically driven process integrates an ambient $CO_2$ capture module that spontaneously absorbs and releases ambient $CO_2$ through a moisture-driven cycle.

In another aspect, as illustrated herein, the invention provides a novel method called electrolytic carbonation to synergize and increase the performance of multi-stream waste management for fly ash carbonation, $CO_2$ capture and mineralization, as well as brine wastewater treatment. In certain embodiments, the acidity generated by electrolysis of brine wastewater can directly dissolve fly ash in the anode and liberate metal ions. The metal ions balance the OH⁻ produced at the cathode to form metal hydroxide, which then fixes $CO_2$ into carbonate precipitates. In addition to minerals from fly ash, high concentrations of $Ca^{2+}$ and $Mg^{2+}$ already present in brine wastewater can be removed through carbonation. The $H_2$ produced during electrolysis can offset energy consumption and potentially make the process energy neutral or positive. One of the advantages of this integrated process is that the materials used, such as sorbent (fly ash), electrolyte (brine wastewater), and $CO_2$, are waste materials generated on site that need to be treated. The resulting $CaCO_3$ from $CO_2$ is a common material for industries, and purified fly ash without calcium has been used to produce geopolymer cement to replace traditional Portland cement, which further reduces carbon emission associated in the cement industry. As demonstrated herein, electrolysis increased metal liberation from fly ash, which resulted in much improved $CO_2$ capture and mineralization compared to spontaneous dissolution of fly ash in water for $CO_2$ sequestration. The $CO_2$ mitigation and energy balance were quantified, showing great benefits for the power industry.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, specific methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, in certain embodiments ±5%, in other embodiments ±1%, and in yet other embodiments ±0.1% from the specified value, as such variations are appropriate to perform the disclosed methods.

As used herein, an "anode" is an electrode where oxidation occurs in an electrolytic cell.

As used herein, an "anolyte" is a portion of the electrolyte in the immediate vicinity of the anode in an electrolytic cell.

As used herein, a "cathode" is an electrode where reduction occurs in an electrolytic cell.

As used herein, a "catholyte" is a portion of the electrolyte in the immediate vicinity of the cathode in an electrolytic cell.

As used herein, the term "cation exchange membrane" refers to a polymeric separator that allows for the transport of cations across the membrane. The term "anion exchange membrane" refers to a polymeric separator that allows for the transport of anions across the membrane. Ion exchange membranes are made of a polymeric material attached to charged ion groups. Anion exchange membranes contain fixed cationic groups with predominantly mobile anions; because anions are the majority species most of the conductivity is due to anion transport. Cation exchange membranes contain fixed anionic groups with predominantly mobile cations; because cations are the majority species most of the conductivity is due to cation transport. Other separator materials can include, but are not limited to glass fibers, cloth, nanofiltration membranes and microfiltration membranes.

Figure 5A:
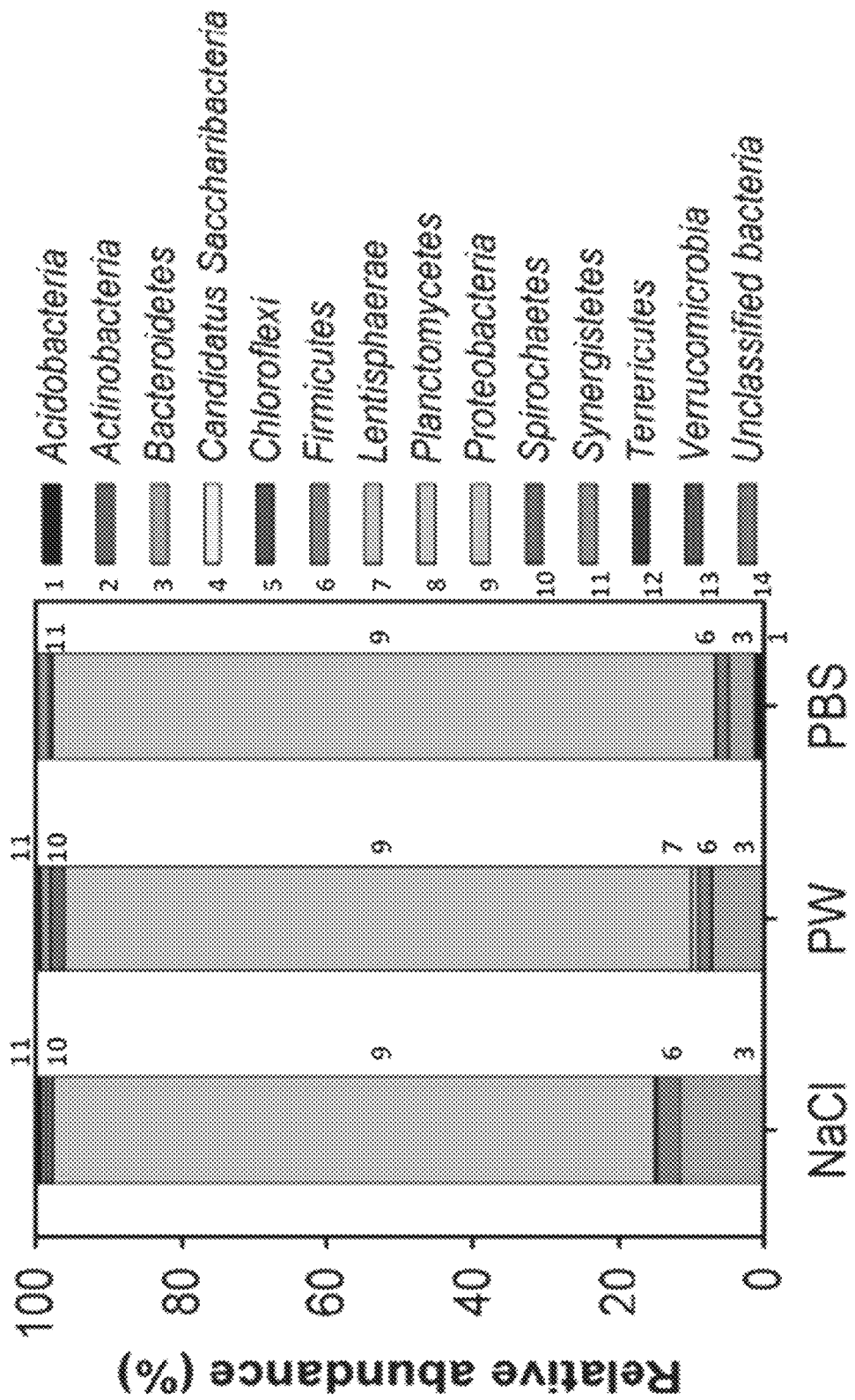
FIGS. 5A-5B are graphs reporting the taxonomic classification of bacterial DNA sequences from communities of anode biofilms in MECC reactors using artificial wastewater (AW) and produced water (PW) electrolytes at the phylum level (FIG. 5A) and the genus level (FIG. 5B). Another biofilm sample obtained from a microbial anode in the lab using common phosphate buffered solution (PBS) electrolyte was used as control for community analysis. Relative abundance was defined as the number of sequences affiliated with phylum and genus divided by the total sequence number per sample. The genera are less than 1% of total composition in all libraries were allocated to "Others".
Figure 5B:
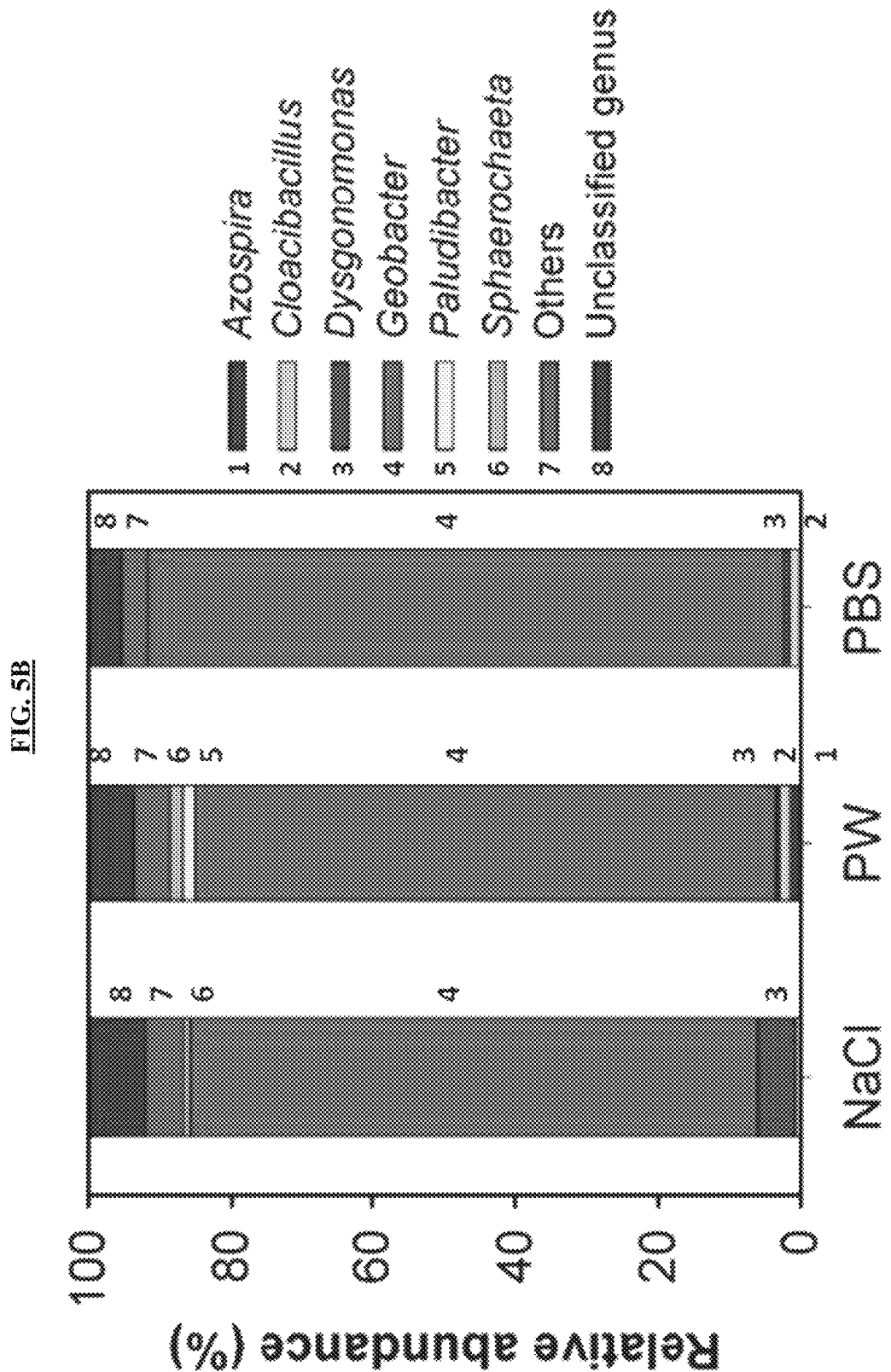

As used herein, "exoelectrogen" refers to a microorganism that has the ability to transfer electrons extracellularly. Exoelectrogens are also known as electrochemically active bacteria, anode respiring bacteria, and electricigens. Electrons exocytosed in this fashion are produced following ATP production using an electron transport chain during oxidative phosphorylation. Conventional cellular respiration requires a final electron acceptor to receive these electrons. Cells that use molecular oxygen ($O_2$) as their final electron acceptor are described as using aerobic respiration, while cells that use other soluble compounds as their final electron acceptor are described as using anaerobic respiration. Non-limiting examples include those bacteria listed in FIGS. 5A-5B, as well as *S. oneidensis* MR-1, *Shewanella putrefaciens* IR-1, *Clostridium butyricum*, *Desulfuromonas acetoxidans*, *Geobacter metallireducens*, *Geobacter sulfurreducens*, *Rhodoferax ferrireducens*, *Aeromonas hydrophilia* (A3), *Pseudomonas aeruginosa*, *Desulfobulbus propionicus*, *Geopsychrobacter electrodiphilus*, *Geothrix fermentans*, *Shewanella oneidensis* DSP10, *Escherichia coli*, *Rhodopseudomonas palustris*, *Ochrobactrum anthropic* YZ-1, *Desulfovibrio desulfuricans*, *Acidiphilium* sp.3.2Sup5, *Klebsiella pneumonia* L17, *Thermincola sp.* strain JR, and *Pichia anomala*.

As used herein, "fly ash" or "pulverized fuel ash" is a coal combustion product composed of the fine particle matter that is driven out of a boiler with the flue gasses. Fly ash is a major byproduct of coal power production. Fly ash composition varies, but most fly ash includes substantial amounts of silicon dioxide, aluminum oxide and calcium oxide as well as trace amounts of a number of heavy metals.

As used herein, the term "mitigation" as related to carbon capture refers to reducing or limiting the overall release of carbon dioxide into the atmosphere.

As used herein, the term "sequestration" as related to carbon capture and storage refers to a process by which carbon dioxide is removed from the atmosphere and held in solid or liquid form. In certain regards, the carbon can be sequestered as carbonate salts. Sequestered carbon can be used for a range of useful purposes such as building materials or permanently stored, for example, underground.

As used herein, the term "wastewater" refers to water that has been adversely affected in quality during anthropogenic activities. Such activities include domestic, industrial, commercial, and agricultural activities, as well as storm-water runoff or pipeline inflow or infiltration.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein: AW: Artificial Wastewater; BECCS: Bioelectrochemical Carbon Capture and Storage; CCS: Carbon Capture and Storage; CE:

Coulombic Efficiency; CEM: Cation Exchange Membrane; COD: Chemical Oxygen Demand; DIC: Dissolved Inorganic Carbon; EAB: Electrochemically Active Bacteria; GHG: Green House Gas; ICP-OES: Inductively Coupled Plasma-Optical Emission Spectroscopy; MECC: Microbial Electrolytic Carbon Capture; PBS: Phosphate Buffered Solution; PCoA: Principal Coordinates Analysis; PW: Produced Wastewater; TIC: Total Inorganic Carbon.

Description

The invention provides an electrolytic system. In certain embodiments, the system of the invention comprises an anodic cell comprising an anode and an anolyte, wherein the anode is at least partially immersed in the anolyte. In other embodiments, the system of the invention comprises a cathodic cell comprising a cathode and a catholyte, wherein the cathode is at least partially immersed in the catholyte. In yet other embodiments, the system of the invention comprises a porous separator or barrier that physically separates the anodic cell and the cathodic cell, wherein the anodic cell and the cathodic cell are in fluidic communication through the porous separator or barrier.

In certain embodiments, the system of the invention comprises an external power source that is connected to the anode and the cathode through electrical conduits, wherein the external power source allows for the application of an external voltage between the anode and the cathode. In yet other embodiments, the power source can any source of electricity such as an electrical grid, solar panels, wind turbines, fuel cells, etc. In yet other embodiments, the system of the invention comprises a first gas inlet to the cathodic cell, wherein the first gas inlet allows for feeding a $CO_2$-comprising gas into the cathodic cell. In yet other embodiments, the anolyte comprises wastewater. In yet other embodiments, the anolyte further comprises a salt of a given cation, such as but not limited to an earth alkaline metal salt. In yet other embodiments, the anolyte comprises one or more anions selected from the group consisting of $NO_3^-$, $SO_4^{2-}$, $Cl^-$, $CO_3^{2-}$, $PO_4^{3-}$, $SiO_4^{4-}$, $CH_3COO^-$ and $SiO_3^{2-}$.

The invention further provides a method of sequestering at least a portion of carbon dioxide ($CO_2$) from a $CO_2$-comprising gas mixture or ambient air. In certain embodiments, the method comprises feeding the $CO_2$-comprising gas into the cathodic cell of a system of the invention through the first gas inlet. In other embodiments, the method comprises applying the external voltage to the system. In yet other embodiments, at least a portion of the $CO_2$ is captured in the form of carbonate or bicarbonate salts in the catholyte.

The invention further provides a method of removing at least a portion of the dissolved organic matter of a wastewater. In certain embodiments, the method comprises adding the wastewater to the anolyte of a system of the invention. In other embodiments, the method comprises feeding a $CO_2$-comprising gas into the cathodic cell of the system through the first gas inlet. In yet other embodiments, the method comprises applying the external voltage to the system. In yet other embodiments, at least a portion of the dissolved organic matter of the wastewater is consumed in the anolyte.

In certain embodiments, the anode is at least partially coated or impregnated with an exoelectrogen biofilm or microbial enzymes. In certain embodiments, the anode and the cathode are at least partially coated or impregnated with an exoelectrogen biofilm or microbial enzymes.

In certain embodiments, the anode and the cathode are independently a platinum electrode and/or a carbon electrode. In other embodiments, the anode and the cathode independently comprise a metal selected from the group comprising platinum, iridium, ruthenium, osmium, nickel, cobalt, tantalum, chromium, rhodium and gallium. In yet other embodiments, the anode and the cathode are independently coated with a polymer, such as, but not limited to, nafion.

In certain embodiments, the anodic cell and/or the cathodic cell is/are independently connected to fluid pumps to aid fluid circulation.

In certain embodiments, the wastewater comprises a dissolved or particulate organic compound or any other biodegradable substrate.

In certain embodiments, the salt of the given cation is less soluble in the anolyte in the absence of the external voltage than in the presence of the external voltage. In other embodiments, the salt of the given cation comprises $CaSiO_3$. In yet other embodiments, the salt of the given cation is derived from a waste material added to the anolyte. In yet other embodiments, the waste material comprises fly ash.

In certain embodiments, the anolyte and/or catholyte independently comprise(s) one or more salts selected from the group consisting of NaCl, $CH_3COONa$, $NH_4Cl$, $CaSiO_3$, $Na_2SO_4$ and KCl.

In certain embodiments, the wastewater has a conductivity from about 3 mS/cm to about 20 mS/cm. In other embodiments, the wastewater has a pH of about 5-9.

In certain embodiments, application of the external voltage dissolves at least a portion of the salt of the given cation in the anolyte. In other embodiments, the external voltage ranges from about 0.1 V-3.5 V; 0.1 V-3.4 V; 0.1 V-3.3 V; 0.1 V-3.2 V; 0.1 V-3.1 V; 0.1 V-3.0 V; 0.1 V-2.9 V; 0.1 V-2.8 V; 0.1 V-2.7 V; 0.1 V-2.6 V; 0.1 V-2.5 V; 0.1 V-2.4 V; 0.1 V-2.3 V; 0.1 V-2.2 V; 0.1 V-2.1 V; 0.1 V-2.0 V; 0.1 V-1.9 V; 0.1 V-1.8 V; 0.1 V-1.7 V; 0.1 V-1.6 V; 0.1 V-1.5 V; 0.1 V-1.4 V; 0.1 V-1.3 V; 0.1 V-1.2 V; 0.1 V-1.1 V; 0.1 V-1.0 V; 0.1 V-0.9 V; 0.1 V-0.8 V; 0.1 V-0.7 V; 0.1 V-0.6 V; 0.1 V-0.5 V; 0.1 V-0.4 V; 0.1 V-0.3 V; 0.1 V-0.2 V; 0.2 V-3.5 V; 0.2 V-3.4 V; 0.2 V-3.3 V; 0.2 V-3.2 V; 0.2 V-3.1 V; 0.2 V-3.0 V; 0.2 V-2.9 V; 0.2 V-2.8 V; 0.2 V-2.7 V; 0.2 V-2.6 V; 0.2 V-2.5 V; 0.2 V-2.4 V; 0.2 V-2.3 V; 0.2 V-2.2 V; 0.2 V-2.1 V; 0.2 V-2.0 V; 0.2 V-1.9 V; 0.2 V-1.8 V; 0.2 V-1.7 V; 0.2 V-1.6 V; 0.2 V-1.5 V; 0.2 V-1.4 V; 0.2 V-1.3 V; 0.2 V-1.2 V; 0.2 V-1.1 V; 0.2 V-1.0 V; 0.2 V-0.9 V; 0.2 V-0.8 V; 0.2 V-0.7 V; 0.2 V-0.6 V; 0.2 V-0.5 V; 0.2 V-0.4 V; 0.2 V-0.3 V. In yet other embodiments, the external voltage ranges from about 0.1 V to about 3.5 V. In yet other embodiments, the external voltage ranges from about 0.2 to about 0.8 V. In yet other embodiments, the external voltage is about 3.5 V; 3.4 V; 3.3 V; 3.2 V; 3.1 V; 3.0 V; 2.9 V; 2.8 V; 2.7 V; 2.6 V; 2.5 V; 2.4 V; 2.3 V; 2.2 V; 2.1 V; 2.0 V; 1.9 V; 1.8 V; 1.7 V; 1.6 V; 1.5 V; 1.4 V; 1.3 V; 1.2 V; 1.1 V; 1.0 V; 0.9 V; 0.8 V; 0.7 V; 0.6 V; 0.5 V; 0.4 V; 0.3 V; 0.2 V, or 0.1 V.

In certain embodiments, application of the external voltage generates hydrogen gas in the cathode. In other embodiments, the cathodic cell allows for capture and collection of at least a portion of the hydrogen gas generated therein. In yet other embodiments, application of the external voltage allows for capture of carbon dioxide in the form of carbonate or bicarbonate salts in the catholyte. In yet other embodiments, an insoluble bicarbonate and/or carbonate salt is formed in the catholyte. In yet other embodiments, the first inlet is in fluidic communication with a column comprising an anionic exchange resin. In yet other embodiments, the porous barrier comprises a cation exchange membrane. In yet other embodiments, the anolyte comprises wastewater. In yet other embodiments, the catholyte comprises wastewater.

In certain embodiments, the system of the invention purifies or treats the wastewater. In other embodiments, the system of the invention removes metal ions from the wastewater in the form of precipitated carbonate and bicarbonate salts. In yet other embodiments, the system of the invention removes organic matter from the wastewater through oxidation. In yet other embodiments, the system is subjected to fluid circulation, so that treated water can flow out of the system and be collected and be replaced by fresh wastewater.

In certain embodiments, the carbon dioxide being captured or sequestered is derived from organic compounds in the wastewater. In other embodiments, the carbon dioxide being captured and sequestered is derived from a $CO_2$-comprising gas, such as an industrial gas. In yet other embodiments, the carbon dioxide being captured and sequestered is a product of fossil fuel combustion.

In certain embodiments, the carbon dioxide being captured and sequestered is atmospheric carbon dioxide. In other embodiments, this can be achieved by connecting a chamber containing an ion exchange resin to the catholyte. The ion exchange resin can absorb and concentrate atmospheric $CO_2$ over a period of time. In certain embodiments, the ion exchange resin comprises a polymer functionalized with positively charge ions. In other embodiments, the ion exchange resin is highly basic and traps the $CO_2$ as carbonate ions in the presence of water. In certain embodiments, before being fed into the cathodic cell, the $CO_2$-comprising gas is contacted with a column comprising an anionic exchange resin, wherein the column is in fluidic communication with the first inlet.

In certain embodiments, the system produces $H_2$ gas through the hydrolysis of water from the electrolyte solution, wherein a potential is applied between the anode and the cathode using an external power source. In other embodiments, the power source is a direct current power source. In yet other embodiments, the applied voltage is about 0.1 V to about 3.5 V. In yet other embodiments, the hydrogen gas produced by the system is captured and collected. In yet other embodiments, the use of a microbial anode allows for a lower applied voltage to be used in order to produce $H_2$ gas.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the present invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Materials and Methods

Wastewater Preparation and Silicate Immobilization

Two types of wastewaters were used to investigate system performance. One was artificial wastewater (AW) (4.5 g/L NaCl, 0.9 g/L $CH_3COONa$, 0.31 g/L $NH_4Cl$ and 0.13 g/L KCl, conductivity=10.65 mS/cm, pH=7.15), which was used as the anolyte. The catholyte was 4.5 g/L NaCl solution only (conductivity=8.93 mS/cm, pH=6.79). No phosphate buffered content was used in the system. The other wastewater was real produced water (PW) collected from a hydraulically fractured shale gas well in Piceance Basin, Colo. The PW was pretreated to partially remove solids, oil and volatile compounds, leaving the following characteristics: total dissolved solids (TDS)=12,442 mg/L, conductivity=19.6 mS/cm, pH=7.08, COD=310 mg/L. The ion concentration in the PW can be found in Table 1. The raw PW was used as both anolyte and catholyte without any buffer addition, except that the anolyte was supplemented with 0.5 g/L $CH_3COONa$ to match the COD concentration with AW for quantitative comparison purpose.

$CaSiO_3$ (wollastonite, 200 mesh, Sigma-Aldrich) was immobilized on a 100% cotton paper matrix to increase its contacting surface area with the electrolyte. The cotton paper was firstly blended with deionized (DI) water in a kitchen blender to form paper pulp, which then was rinsed using DI water to remove residual ions and alkalinity (final pH=7). The paper pulp and $CaSiO_3$ powder were mixed using blender at a weight ratio of 1:2. The paper carrying 20 mg-$CaSiO_3$/$cm^2$-paper surface with a thickness of 0.48 mm was then made by adding the pulp/$CaSiO_3$ mixture to a papermaking mold (Arnold Grummer). The regenerated paper can be stable in the water for several weeks without any deterioration.

General Procedure for Fly Ash Experiments

Coal fly ash was obtained from Valmont Power Station in Boulder, Colo., USA. The fly ash sample has a particle size 0.6-98.1 μm with a median size of 35.3 μm. The sample is composed of $SiO_2$ (46.76 wt. %), $Al_2O_3$ (22.39 wt. %), CaO (12.22 wt. %), $SO_3$ (6.91 wt. %), $Fe_2O_3$ (2.74 wt. %), $K_2O$ (1.12 wt. %), $Na_2O$ (1.10 wt. %), MgO (1.13 wt. %), Pb (0.005 wt. %) and U (0.001 wt. %).

Two electrolytes were used (28 g/L NaCl and 35 g/L $Na_2SO_4$) to simulate the waste brine generated after boiler feed pre-treatment in power plants. The fly ash slurry was firstly prepared by mixing 18 g fly ash with 350 mL electrolyte in a sealed bottle for 2 hours until equilibrium was reached. The headspace was sparged with ultra-high pure nitrogen gas (99.999%) to prevent air $CO_2$ absorption. The mixture was then poured into and filtered by the porous centrifuge tube assembly, and the filtrate was collected by the electrolytic cell. The whole process was swiftly performed to minimize air $CO_2$ absorption. Electrolysis was then conducted by applying a 3.5 V voltage across the electrodes for 1 hour. A control experiment was performed following the same procedure but without any voltage applied. After electrolysis, the electrodes and the tube containing purified fly ash were removed, together with 20 mL electrolyte for analysis. The remaining electrolyte was then gently flushed with 15% $CO_2$/85% $N_2$ until the electrolyte pH reached to 8.3, which is the saturation point of $CaCO_3$ under atmospheric $CO_2$ pressure that limits precipitate dissolution.

The elemental composition of fly ash and its extract in electrolyte was analyzed by an inductively coupled plasma optical emission spectroscopy (ICP-OES) (ARL Fisons 3410+). The fly ash sample was digested by hydrofluoric acid before measurement by ICP-OES. DIC was analyzed using the method described elsewhere herein, after the samples were filtered by a 0.22 μm membrane. The difference between TIC and DIC was the inorganic carbon embedded in carbonate precipitate.

MECC Reactor Construction 1

Each MECC reactor contains two cylindrical chambers (4 cm long×3 cm diameter) made of cubic polycarbonate and separated by a cation exchange membrane (CEM) (CMI-7000, Membrane International). An Ag/AgCl reference electrode (0.198 V vs SHE; RE-5B, BASi) was placed into the anode chamber for potential measurements. Graphite-fiber brush (2.5×2.5 cm, 0.23 $m^2$) and carbon cloth (7 $cm^2$, 30% wet proofing; Fuelcellearth, USA) containing a 0.5 mg/$cm^2$ of Pt catalyst were used as the anode and cathode, respectively.

The microbial anodes were acclimated first in single-chamber microbial fuel cells using the same AW or PW with the sludge inocula obtained from an anaerobic digester in Boulder Water Resource Recovery Facility (Boulder, Colo.). After stable voltage generation for more than 30 days, the anodes were transferred to the MECC reactors. Each anode or cathode chamber was connected with an external reservoir, and a volume of 230 mL electrolyte was recycled at a rate of 3 ml/min between each chamber and the respective reservoir (FIG. 1). The paper carrying silicate was placed in the anolyte reservoir. A gas bag (500 mL, Calibrated Instruments Inc.) was connected to the catholyte reservoir headspace for gas collection at atmospheric pressure. Pure $CO_2$ was intermittently injected into the headspace to maintain a $CO_2$ concentration of 5-15% in order to simulate typical flue gas condition. A fixed voltage of 0.8 V was applied from an external power source in between the electrodes across a 10Ω resistor. Both reactors and reservoirs were tightly sealed with non-air permeable tubing to prevent atmospheric $CO_2$ intrusion, and all headspaces were sparged with $CO_2$-free, ultra-high purity $N_2$ (99.999%) before experiments. Two abiotic controls were operated with and without external applied voltage were operated in parallel with active reactors to investigate potential carbon capture and $H_2$ production under abiotic±electrochemical conditions. The same concentration of $CO_2$ and $CaSiO_3$ were applied to the controls as the active reactors.

MECC Reactor Construction 2

Figure 6:
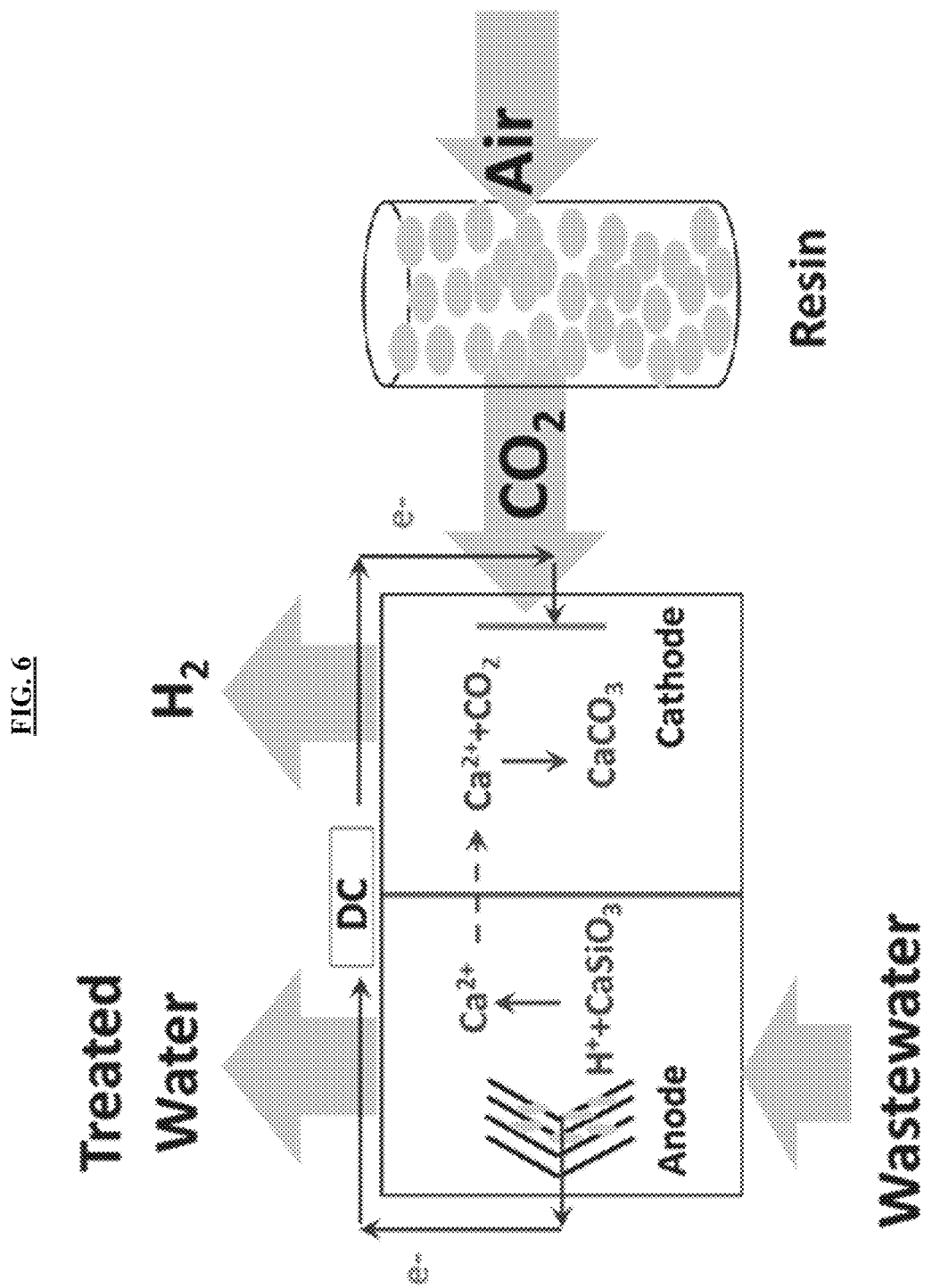
FIG. 6 is a schematic of the integrated ambient $CO_2$ capture and storage using resin and MECC. The system consisted of an ion exchange resin column that captures and concentrates ambient $CO_2$. The concentrated $CO_2$ was then transferred into a microbial electrochemical carbon capture (MECC) reactor for carbon sequestration and hydrogen production.

The reactor consists of two modules: a microbial electrolytic carbon capture (MECC) module for wastewater treatment and mineral dissolution (calcium silicate), and an ambient $CO_2$ capture module (FIG. 6). The electrolysis module consists of two cylindrical chambers (4 cm long×7 cm diameter) made of polycarbonate and separated by a cation exchange membrane (CEM) (CMI-7000, Membrane International). Graphite-fiber brush (5 cm in diameter and 7 cm long) and carbon cloth (38 $cm^2$, 30% wet proofing; Fuel Cell Earth, Woburn, Mass.) containing a 0.5 mg/$cm^2$ of Pt catalyst were used as the anode and cathode, respectively (Lu, et al., 2015, Environ. Sci. Technol. 49(13):8193-8201). The ambient $CO_2$ capture and release module comprises a glass tube (Ace glass Inc., Vineland, N.J.) filled with 75 g strong base ion exchange resin comprising quaternary ammonium functional group (Marathon™ A, $OH^-$ Form, DOWEX, US). The ion exchange resin spontaneously absorbs and releases $CO_2$ in a moisture-driven process. A three-way valve was used in the ambient $CO_2$ capture module to switch between the moisture cycle ($CO_2$ release) and the dry cycle ($CO_2$ capture).

The MECC anode was first acclimated in a microbial fuel cell using acetate substrate and sludge inocula. After stable voltage was reached for more than 30 days, the anode was transferred to the MECC module. An external 0.8 V was applied to the reactor using an external power source (denoted as DC in FIG. 6) to catalyze microbial electrolysis. A 10Ω resistor was connected between the power source and cathode for voltage recording with a Keithley 2700 data logger (Keithley, Cleveland, Ohio). The MECC was then acclimated using acetate substrate in the anode (4.5 g/L NaCl, 0.8 g/L $CH_3COONa$, 0.31 g/L $NH_4Cl$ and 0.13 g/L KCl, conductivity 9.33 mS/cm) and 4.5 g/L NaCl solution (conductivity 7.16 mS/cm) in the cathode, until stable microbial electrolysis performance was achieved. The MECC $CO_2$ capture experiment was then conducted by adding fresh anode and cathode solutions to respective chambers and adding 1 mL $CaSiO_3$ suspension (1 g silicate/50 mL DI water) to the anode solution to provide silicate for mineral dissolution. The MECC experiment was then performed in the fed batch mode over a 24-h period for each run. The anode and cathode pH was measured approximately every 2 h. The cathodic $CO_2$ capture was performed approximately every six hours and 1 mL $CaSiO_3$ suspension was added to the anode chamber every time cathodic $CO_2$ capture was performed to ensure the availability of $CaSiO_3$. An abiotic control was done using a bacteria-free anode following the same protocol as the MECC experiment.

For $CO_2$ capture operation, the glass column was first isolated from the MECC cathode by a 3-way valve. Air was directly pumped into the glass tube at 120 ml/min until the ion exchange resin was completely dried and $CO_2$ saturated (approximately 4 h). The column saturated with $CO_2$ was then connected to the cathodic solution through the valve and air-tight tubing, and 100 mL DI water was added to the column to facilitate $CO_2$ release (FIG. 6). The $CO_2$ was carried by pure nitrogen gas into the cathode chamber at 120 ml/min for 30 min. After that, the air capture process was repeated in the column while at the same time the MECC was operated to convert the concentrated $CO_2$ into carbonate salts.

Coal Fly Ash Reactor Construction

Figure 10:
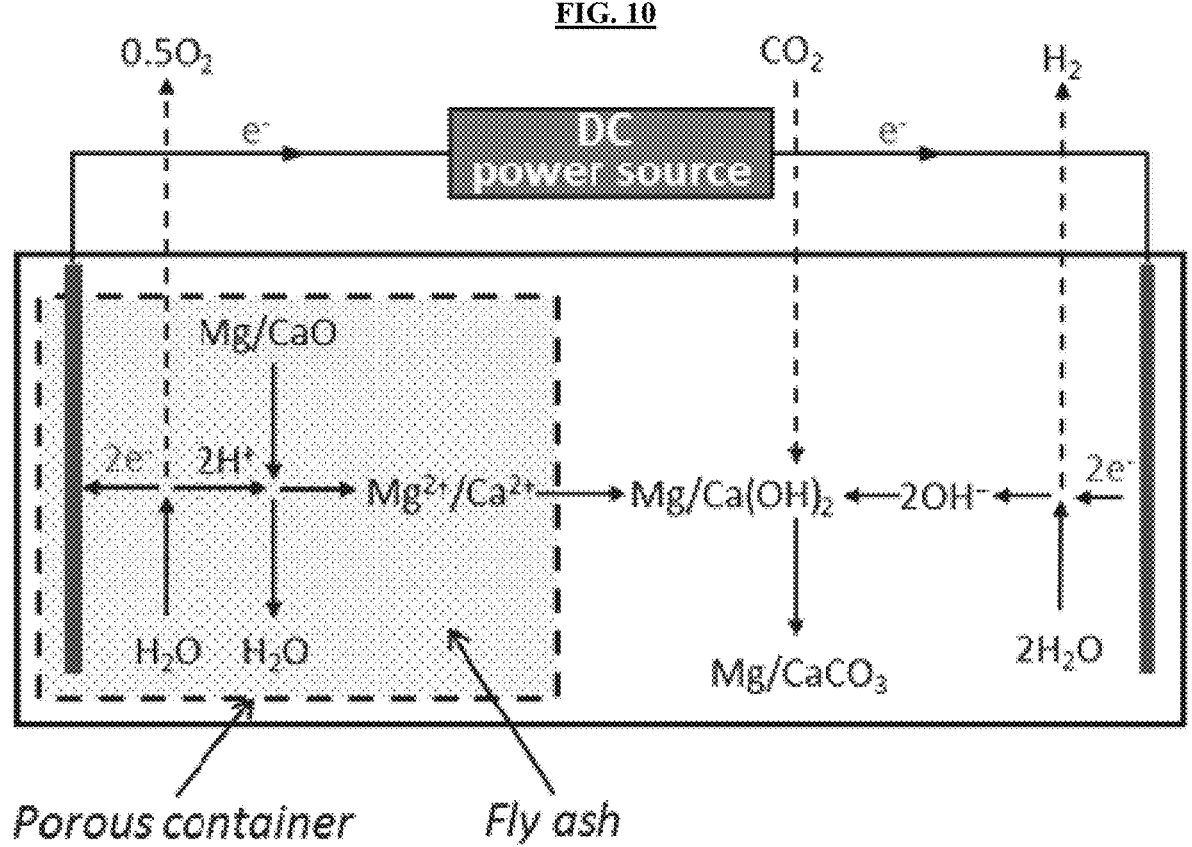
FIG. 10 is a schematic of the electrolytic carbonation of coal fly ash for in situ carbon capture and mineral recovery.

Electrolysis was carried out in a plastic container with 350 mL electrolyte (FIG. 10). Two graphite rods (1 cm diameter× 10 cm length) were placed 4 cm apart to serve as the anode and cathode, respectively. In some cases, the anode was coated with a layer Nafion film (5 mg/$cm^2$) to form oxygen selective electrode for the NaCl electrolyte, while no coating was applied for the $Na_2SO_4$ electrolyte. The anode was placed in a 50 mL porous centrifuge tube equipped with a cellulose extraction thimble (2.5 cm diameter×10 cm length, Whatman, UK), so fly ash slurry could be added into the tube without leaching to the main container. The electrolytic cell was covered to prevent air exposure. An external voltage of 3.5 V was applied between the electrodes across a 1 ohm resistor. The electrolyte was stirred by a magnetic stirrer at 120 rpm.

General Analytical Methods and Calculations

The concentration of $H_2$ or $CO_2$ was analyzed by a gas chromatograph (Model 8610C, SRI Instruments) equipped with a thermal conductivity detector with nitrogen and helium as the carrier gas, respectively. The cumulative volume of each gas was calculated based on gas volume in the gas bag and reservoir headspace. Chemical oxygen demand (COD) was measured using a standard method (HACH Company) and acetate consumption was calculated based on 0.78 g-COD/g-sodium acetate assuming complete oxidation. Then sodium acetate was converted to initial total organic carbon input. The concentrations of ion species were analyzed by inductively coupled plasma optical emission spectroscopy (ARL Fisons 3410+) and ion chromatography (Dionex 4500).

Total inorganic carbon (TIC) was measured based on established chemical gas extraction-absorption method. Briefly, 10% (w/w) phosphoric acid was added to the solution sample and $CO_2$ was extracted and carried by $CO_2$ free high-purity $N_2$ (99.999%) to a three-stage alkali (0.1 M) absorption cell. The absorption solution was first titrated to pH 8.3 (phenolphthalein end point) by 0.1 M HCl to neutralize surplus base and transfer $CO_3^{2-}$ to $HCO_3^-$, then it was further titrated to pH 4.4 (methyl orange end point) using 0.01 M HCl to neutralize $HCO_3^-$. The HCl consumption in the second titration step was used to calculate the TIC. The carbon recovery was more than 99%±1 based on statistical analysis of inorganic carbon in a standard sodium carbonate solution. Dissolved inorganic carbon (DIC) was obtained using the same method after 0.22 μm membrane filtration. The difference between TIC and DIC was the inorganic carbon embedded in suspended solid in solution. This method was also used for the determination of inorganic carbon on the paper matrix by soaking it in $CO_2$-free DI water for acid extraction of $CO_2$. All TIC and DIC results were reported by deducting background values of raw electrolytes and paper. X-ray diffraction (XRD) was carried out on a Panalytical X'Pert diffractometer using Cu radiation at 45 KV/40 mA. Scans were run over the range of 10° to 90° with a step size of 0.0131 and a counting time of 250 seconds per step.

Electrical current was determined by measuring the voltage over a high-precision resistor using a data acquisition system (model 2700, Keithley) at 10 min intervals. $H_2$ production rate ($m^3$-$H_2$/$m^3$ reactor/day) and volumetric current density (A/$m^3$) was normalized to effective anode chamber volume. Coulombic efficiency (CE, %), cathodic hydrogen recovery (%), and overall $H_2$ recovery (%) were calculated based on previously reported methods. The amount of electric energy consumption ($W_E$) over a period of time (t) was calculated by the equation $W_E=\int_0^t IE_{ap}dt$, where I and $E_{ap}$ are current and the applied voltage, respectively. The produced $H_2$ energy was calculated based on its upper heating value of combustion (285.83 kJ/mol).

In the experiments where bioelectrochemically mediated water treatment was implemented, the conductivity and pH of anode and cathode solutions were measured periodically with appropriate probes (Thermo Scientific, Waltham, Mass.) to monitor the microbial electrolysis activities. The anode was refilled with 1 ml $CaSiO_3$ suspension every time the anode pH dropped below 7.0 to ensure calcium availability. The COD of the anode solution was measured at the beginning and the end of the experiments using Hach HR COD vials (Hach Company, Loveland, Colo.). The inorganic carbon concentrations of anode and cathode solutions were measured at the end of experiments using the standard titration method as detailed in Lu, et al., 2015, Environ. Sci. Technol. 49(13):8193-8201. The result was reported in mmol/L per the titration method and normalized to the volume of the cathode solution. The ion concentrations of anode and cathode solutions, including $Ca^{2+}$, $K^+$, $Na^+$, $Mg^{2+}$, $Al^{3+}$, and $Cl^-$, were measured at the beginning and end of experiments using inductively coupled plasma optical emission spectroscopy (ICP-OES). The carbonate precipitates on the CEM were rinsed off with 1 M HCl solution and the ion concentrations were measured using ICP-OES. The results were normalized to the anodic volume. The $CO_2$ capture capacity of 75 g ion exchange resin was quantified using the following procedure: First, the resin was dried with air until $CO_2$ saturation; second, the resin column was immersed in water to release the $CO_2$, which was then carried by $N_2$ gas into three 150 ml 0.013 M NaOH solutions that were sequentially connected. After 30 min of $N_2$ gas flushing, 50 ml of each NaOH solution was taken for inorganic carbon quantification using the standard titration method.

Crystalline phases of precipitate were characterized by X-Ray Diffraction (XRD) spectroscopy. All experiments were repeated in triplicate, and the mean value was reported for each parameter.

The current (I) across the circuit was calculated by voltage (V) and resistor (R), as I=V/R. The corrected electrical energy consumption ($W_E$) by electrolysis over a period of time (t) was calculated by $W_E=\int_0^t (IE_{ap}-I^2R)dt$, where $E_{ap}$ is the applied voltage by power source. The produced hydrogen energy ($W_{H2}$) was calculated as $W_{H2}=\int_0^t Idt/2F\Delta H_{H_2}$, where F is the Faraday's constant (96,485 C/mol $e^-$), $\Delta H_{H2}$ is the upper heating value of $H_2$ combustion (285.83 kJ/mol), and 2 is a factor to convert moles of $e^-$ to moles of $H_2$. Then the practical energy consumption (W) excluding energy consumption for stirring is W=$W_E$−0.6 $W_{H2}$, where 0.6 is the estimated energy exchange efficiency in a typical hydrogen fuel cell. $H_2$ production was not continuously monitored due to operational limits, but $H_2$ was calculated based on current production, which has been a standard practice in electrolysis studies. Assuming this W was directly obtained from the power plant, an additional 0.293 g-$CO_2$/kJ can be counted due to combustion of fossil fuel. On the other hand, 0.21 kg-$CO_2$ emission can be avoided for every kg of $CaCO_3$ produced using this electrolytic carbon capture process instead of currently commercial $CaCO_3$ production route.

Bacterial Community Structure Analysis

The bacterial community structures of anode biofilms under different conditions were analyzed using high-throughput 454 GS-FLX pyrosequencing of the 16S rRNA. Another biofilm sample obtained from the anode of an active PBS-buffered microbial electrolysis reactor without silicate dissolution and $CO_2$ capture was used as a control for community analysis. The pyrosequencing and bioinformatics analysis were carried out according to previously described methods. Raw sequencing data were deposited to the NCBI Sequence Read Archive (SRA) with accession No. 208 SRP051647.

Energy Balance of the Modular $CO_2$ Capture Reactor

The energy balance of the modular $CO_2$ capture reactor was calculated as: Energy balance=($E_{H2}$−$E_{electricity}$)/COD (kJ/gCOD), where $E_{H2}$, $E_{electricity}$, and COD were the energy recovered in hydrogen gas, the electricity consumed by the MECC module, and the COD consumption respectively. The electricity consumed was calculated by integrating the multiplication of applied voltage and current over time based on experiment data, $E_{electricity}=\int VIdt$. The energy recovered in hydrogen was calculated as $E_{H2}=286\times\emptyset$, where 286 was the heat content of hydrogen gas (kJ/mol) and $\emptyset$ was the hypothetical hydrogen gas recovery percentage based on electron balance. In the sensitivity analysis, $\emptyset$ was varied from 50% to 90% to understand the sensitivity of energy balance to the hydrogen gas recovery percentage.

CO$_2$ Balance of the Modular CO$_2$ Capture Reactor

CO$_2$ balance was calculated as: CO$_2$balance=(CO$_{2\text{-}capture}$−CO$_{2\text{-}release}$)/COD(gCO$_2$/gCOD).

The total CO$_2$ captured in the process was calculated as: CO$_2$-capture=CO$_{2\text{-}cathode}$+CO$_{2\text{-}anode}$+CO$_{2\text{-}avoided}$ (gCO$_2$/gCOD) where CO$_{2\text{-}anode}$ and CO$_{2\text{-}cathode}$ were the inorganic carbon captured by the anode and cathode at the end of experiments. The avoided CO$_2$ emission, CO$_2$-avoided, was calculated by assuming that the hydrogen gas generated in the MEC process is used to replace natural gas on the basis of heating value: CO$_{2\text{-}avoided}$=E$_{H2}$×φ$_{NG}$, where E$_{H2}$ was the heat content of hydrogen gas as detailed elsewhere herein, and φ$_{NG}$ was the emission factor of natural gas (53.6 gCO$_2$/mmBTU).

The total CO$_2$ released in the process (gCO$_2$) was calculated as: CO$_{2\text{-}release}$=CO$_{2\text{-}COD}$+CO$_{2\text{-}electricity}$, where CO$_{2\text{-}COD}$ was the CO$_2$ released from COD oxidation, and CO$_{2\text{-}electricity}$ was the embedded CO$_2$ emission from electricity consumption. It was assumed that 2 mol CO$_2$ was produced when 1 mol of acetate was completely oxidized according to stoichiometry (CO$_{2\text{-}COD}$=COD=32×44). CO$_{2\text{-}electricity}$ was calculated based on the emission factor of electricity consumption in the US: CO$_{2\text{-}electricity}$=φ$_{electricity}$×E$_{electricity}$, where φ$_{electricity}$ was 558 g CO$_2$/kWh, the average emission intensity of electricity production in the US according an EPA report; and E$_{electricity}$ was the electricity consumption as noted elsewhere herein.

Example 1: Current Production and Buffer Capacity Formation (MECC Reactor 1)

Figure 2A:
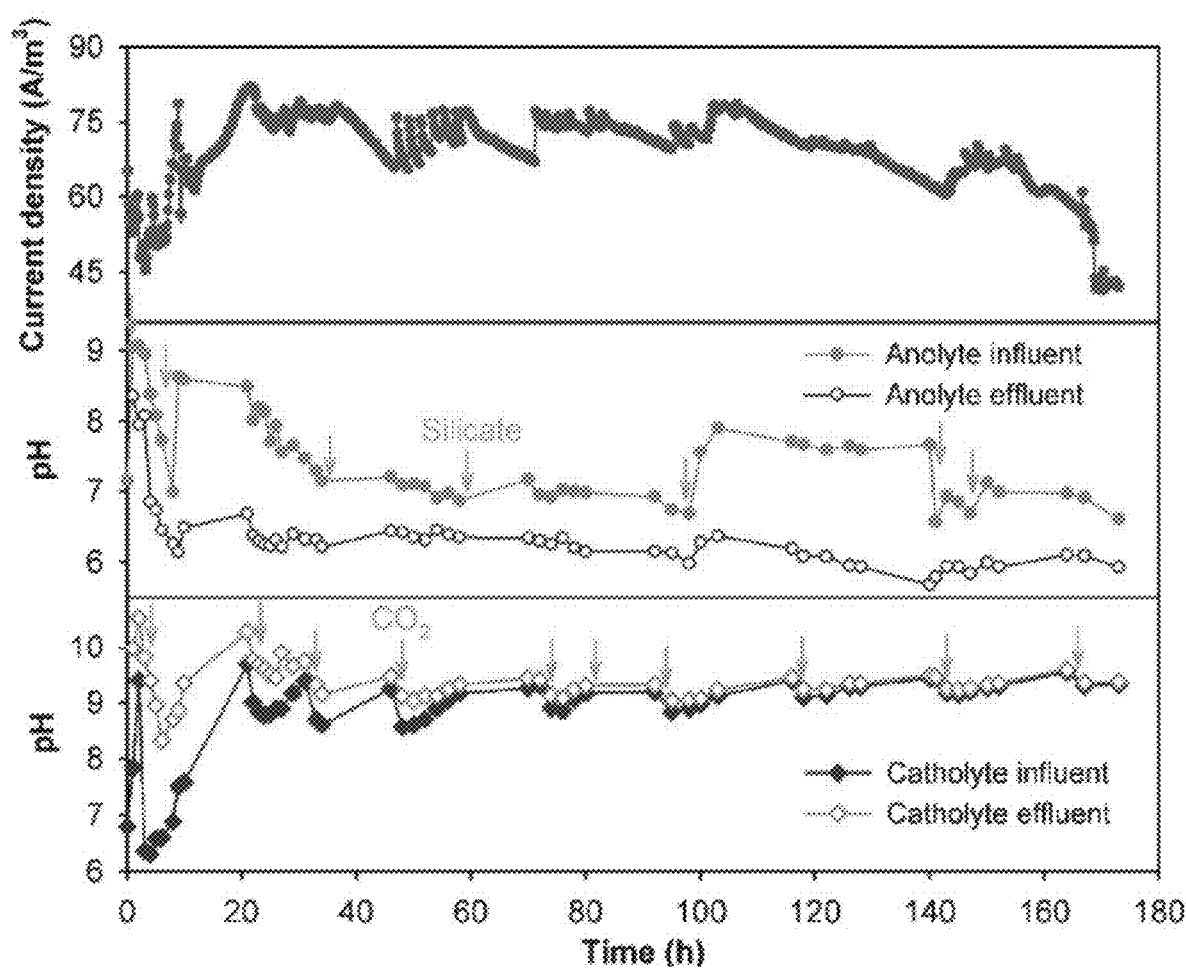
FIGS. 2A-2E are graphs reporting current generation and pH profile of the anolyte and catholyte during active MECC operation (FIGS. 2A-2C) using artificial wastewater (FIGS. 2A-2B) and produced water electrolytes (FIG. 2C), as well as during control, abiotic operation using artificial wastewater (FIG. 2D) and produced water electrolytes (FIG. 2E) with an applied voltage of 0.8 V. The wastewater inflow and outflow of each chamber was sampled and measured with time. The arrows indicate silicate dosing into anolyte reservoir and external $CO_2$ injection into the headspace of the catholyte reservoir.
Figure 2B:
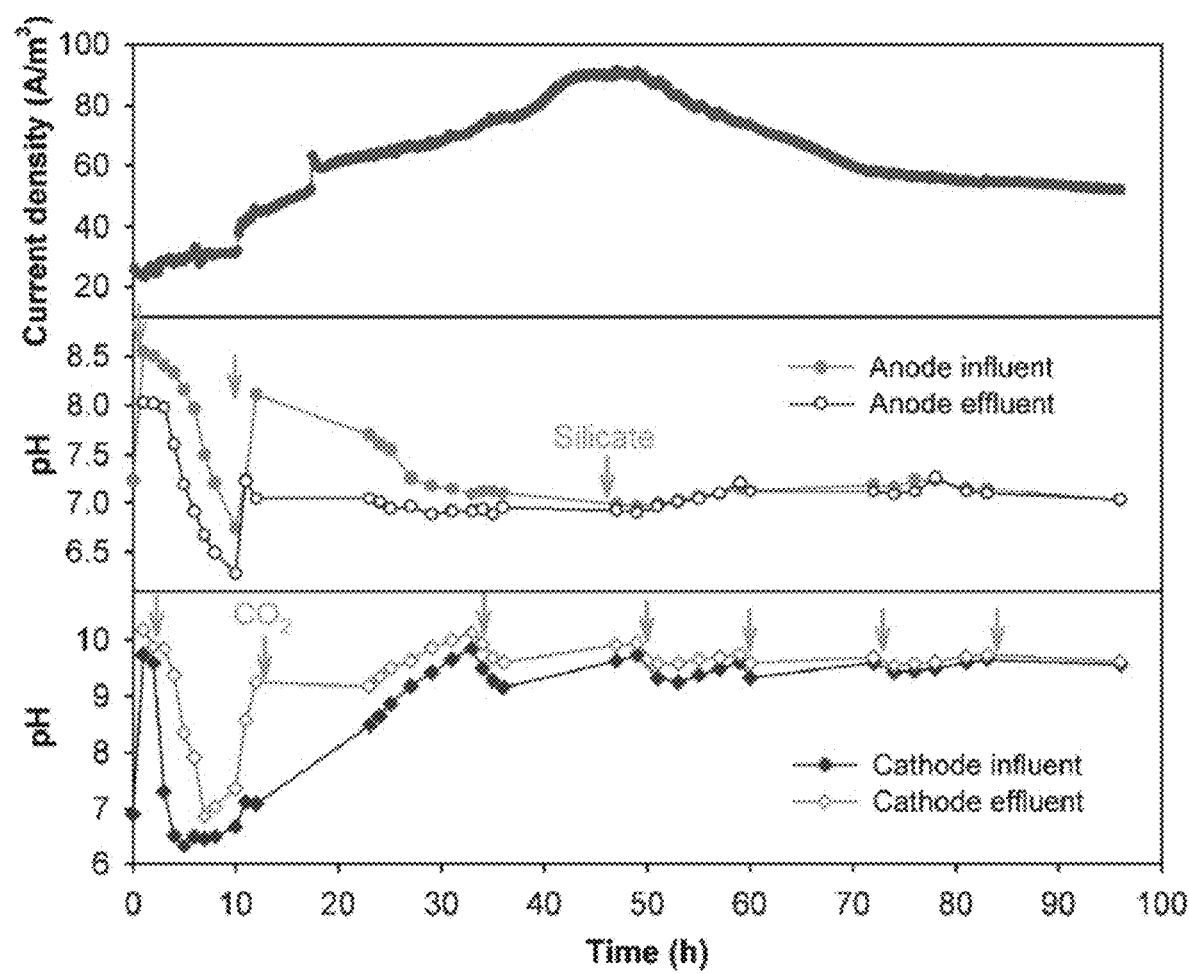
Figure 2C:
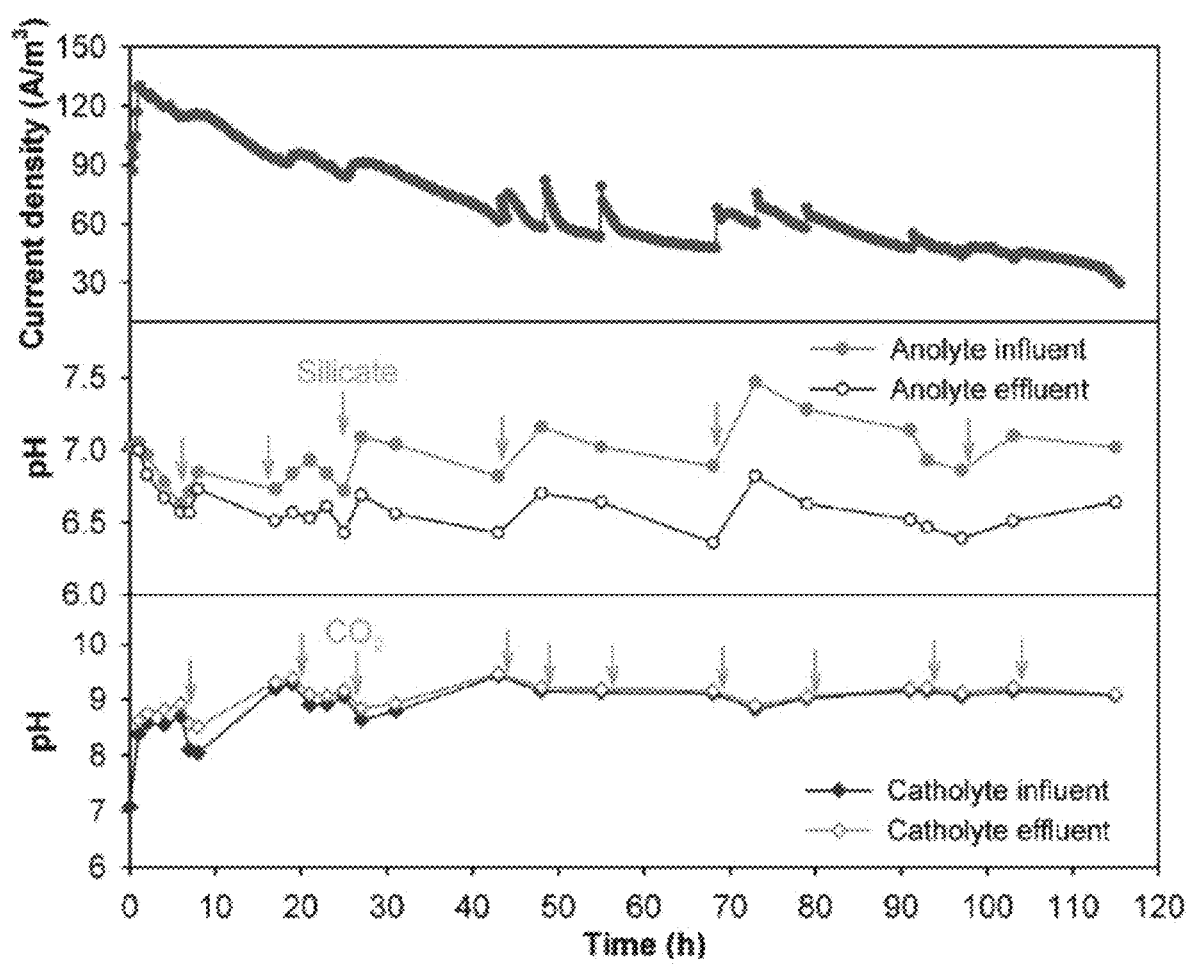
Figure 2D:
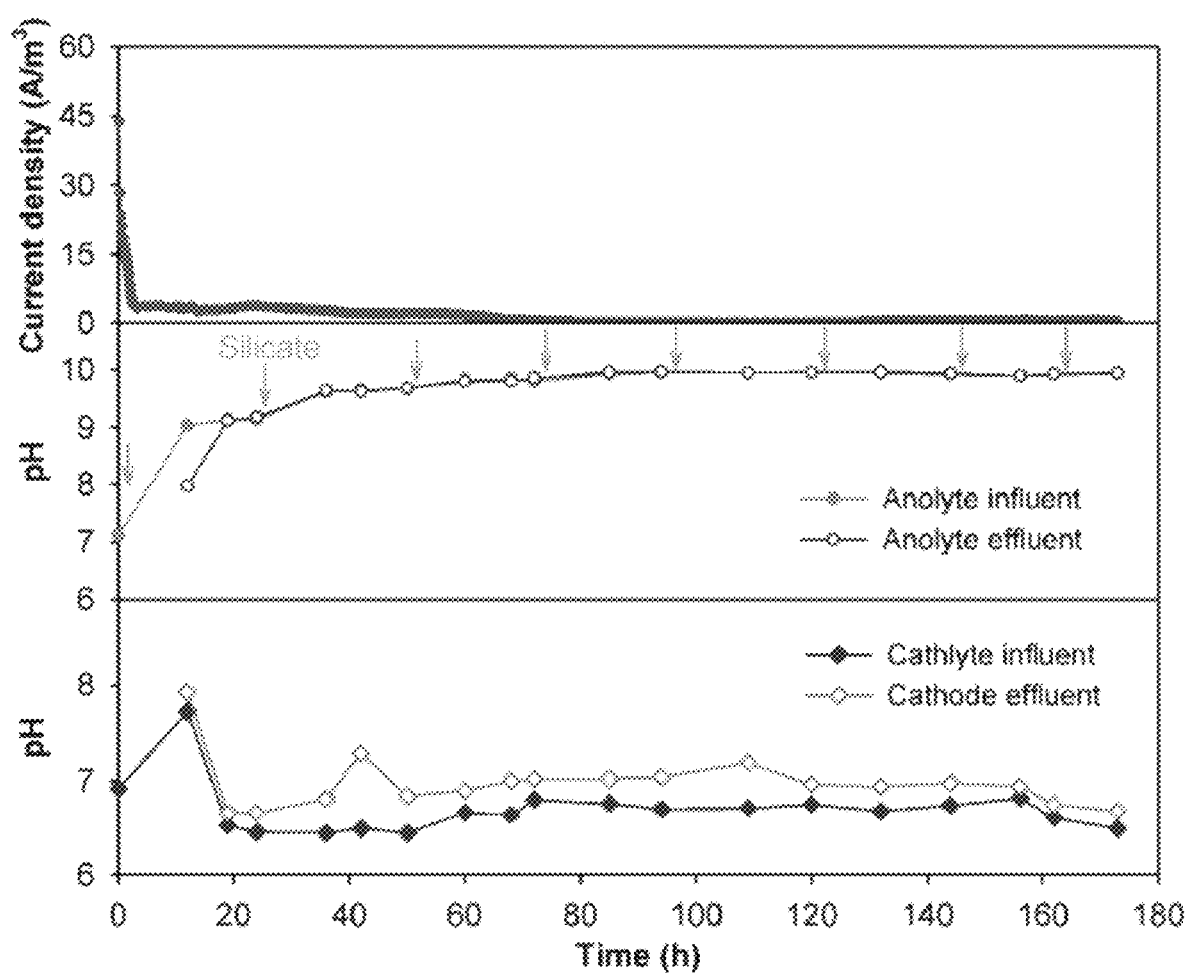
Figure 2E:
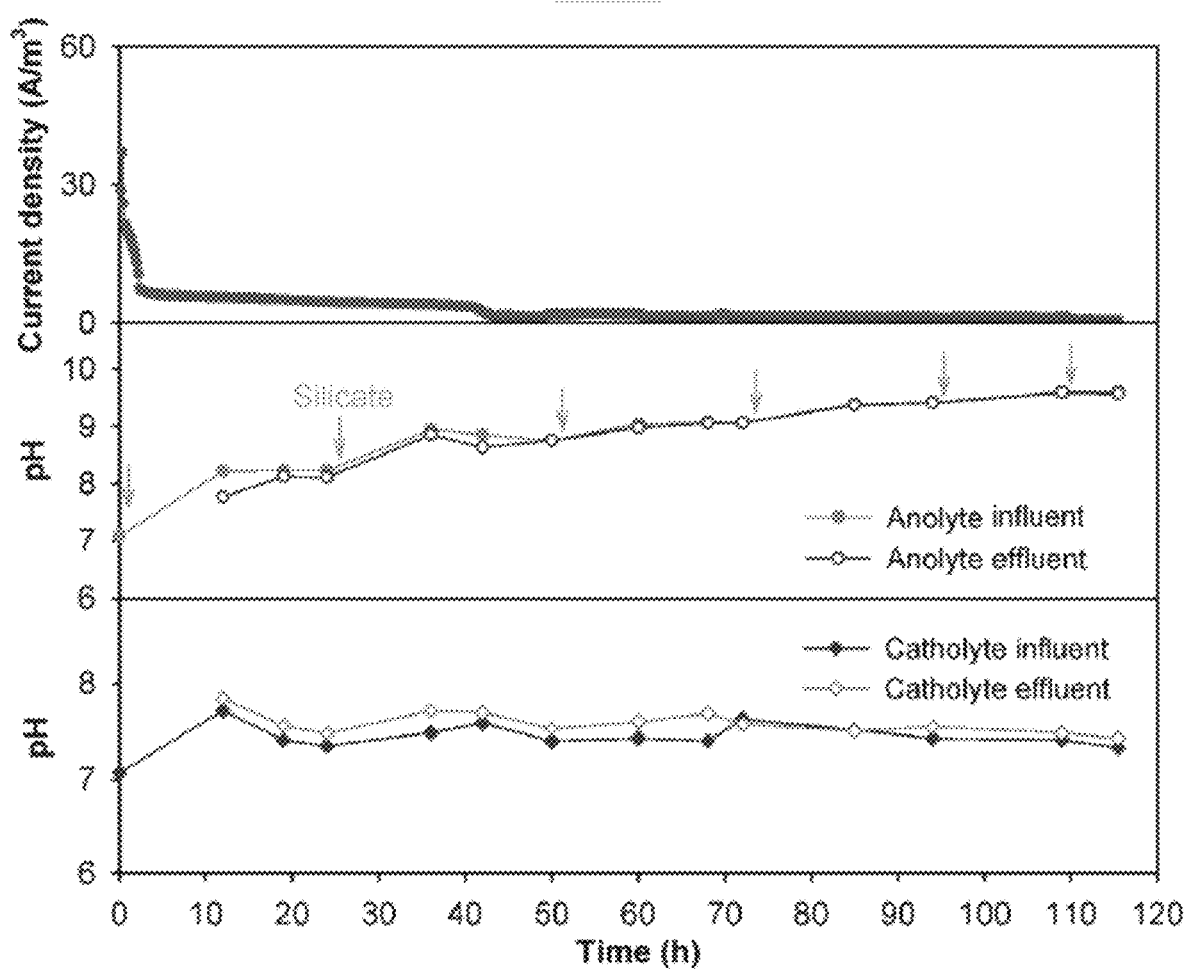
Figure 2F:
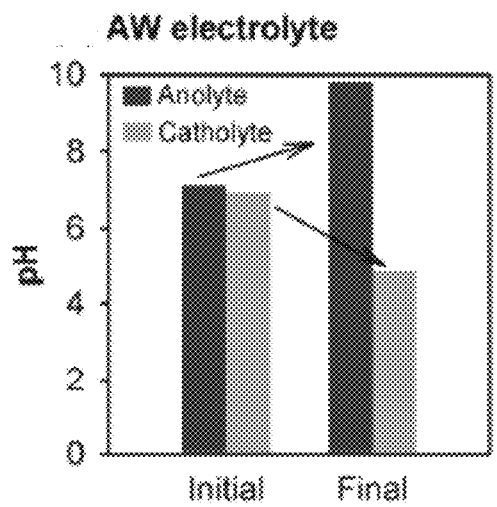
FIGS. 2F-2G are graphs reporting pH of anolyte and catholyte at the beginning and end of abiotic control MECC process, using (FIG. 2F) artificial wastewater and (FIG. 2G) produced water electrolytes without applied voltage.
Figure 2G:
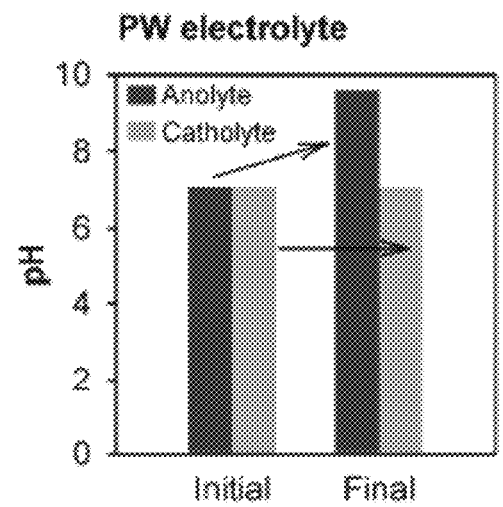

MECC reactors constructed according to MECC reactor construction 1 were operated in continuous-flow mode using both AW and PW. Despite a similar COD provided in both reactors, the maximum current generated from PW reached to 130 A/m$^3$, which was 58% higher than the peak current from AW (FIGS. 2A-2C). Without wishing to be limited by any theory, this may be at least partially explained by the more than doubled conductivity of PW over the synthetic media. The current gradually dropped in the PW reactor, suggesting recalcitrant substrates in raw produced water inhibited the continued biodegradation. This is supported by the COD removal results: compared with nearly 100% COD removal in the AW, the COD removal in the PW was around 56%. Because a similar COD concentration was needed to perform the study, no produced water only control was performed. However, the same raw produced water was treated using a microbial capacitive desalination cell without any acetate amendment, and a COD reduction of 50-80% was observed in the anode chamber during batch operation. Near zero current was produced in abiotic control reactors even with the same applied voltage and substrate (FIGS. 2D-2E).

The pH in the AW electrolyte fluctuated at the beginning, while the pH of PW electrolyte was more stable due to it higher alkalinity. The pH of both wastewaters stabilized over time in spite of the addition of silicate in the anode chamber and CO$_2$ in the cathode chamber, suggesting sufficient buffer capacity formed via CO$_2$ reaction with OH$^−$ and formation of metal (bi)carbonates. For both wastewaters, an apparent and sustainable pH cycle was observed between the anolyte influent (higher pH) and the effluent (lower pH) in continuous-flow operation (FIGS. 2A-2C). This indicates that protons were generated by microbial oxidation in the anode chamber, which were then effectively consumed during silicate dissolution to release mineral ions. In certain embodiments, this helps maintain neutral anolyte pH, favoring the growth of effective microbial communities. The pH in both catholytes remained very stable at around 9.2, because the capture and reduction of CO$_2$ in the catholytes effectively consumed the accumulated OH$^−$ and generated (bi)carbonate buffer (HCO$_3^−$/CO$_3^{2−}$), preventing pH increase as observed in normal water electrolysis. Anolyte pH increased from neutral to 9.6-10.0 due to spontaneous wollastonite dissolution in abiotic controls with or without applied voltage for both wastewaters (FIGS. 2D-2E), because no protons were produced in abiotic reactors to neutralize the pH increase. Adding additional CaSiO$_3$ did not further elevate anolyte pH, indicating equilibrium was reached between the wollastonite and ions liberated therefrom. The catholyte pH in abiotic controls stayed relative stable (PW) or decreased to 4.8-6.5 (AW), indicating no or limited OH$^−$ production (FIGS. 2D-2E).

The ability to keep the pH stable in both anode and cathode chambers is sustainable and important, because pH fluctuation is a major challenge in both abiotic electrolysis and bioelectrochemical systems. In such systems, the H$^+$ produced at the anode or OH$^−$ produced at cathode during electrolysis cannot efficiently transfer between the chambers to maintain electroneutrality, which causes significant pH drop in the anode and pH increase in the cathode unless high buffer capacity is provided. The MECC process resolves this problem by integrating the electrolysis with mineral dissolution, alkalinity production, CO$_2$ uptake, and (bi)carbonate formation, allowing such in situ reactions to alleviate pH fluctuation, eliminate expensive buffer addition, and maintain effective microbial and electrochemical reactions.

Example 2: Carbon Capture Mechanism and Carbon Balance (MECC Reactor 1)

Figure 4C:
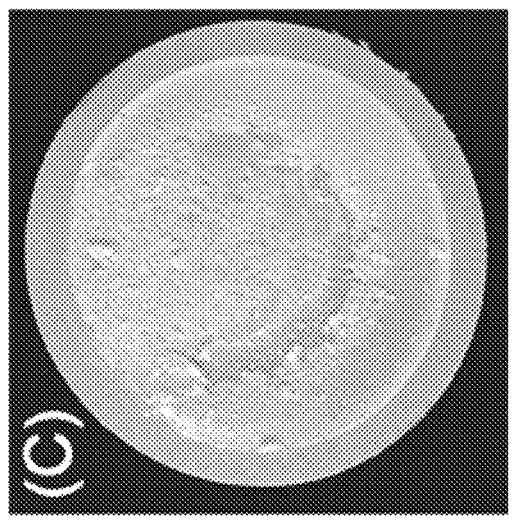
FIGS. 4A-4C are pictures depicting $CaCO_3$ formation after $CO_2$ capture in MECC processes.
Figure 4B:
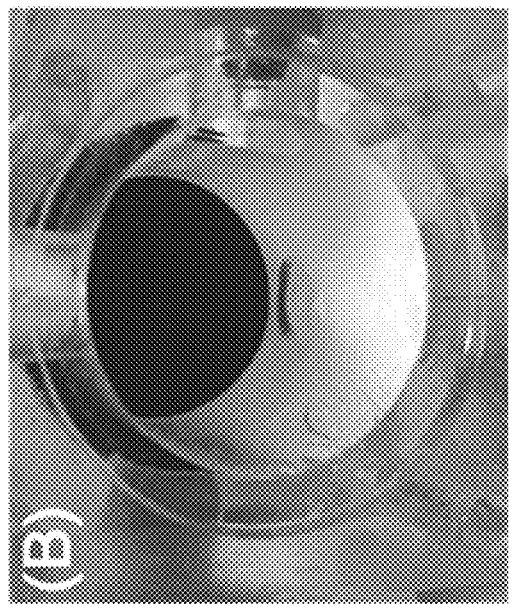
Figure 4:
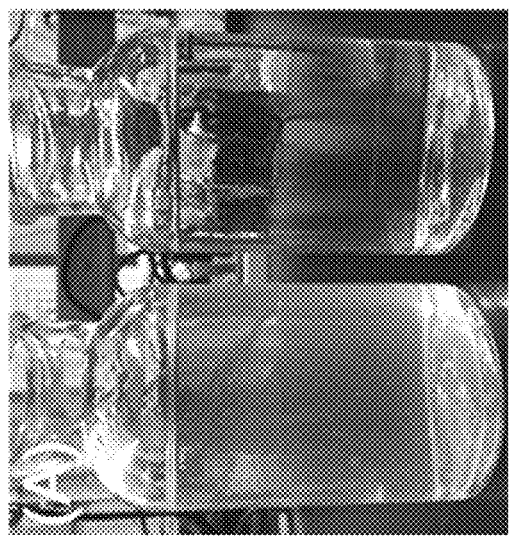

Compared with the abiotic control without applied voltage, a significant increase in Ca$^{2+}$ concentration (from non-detectable to 497.0 mg/L) and Si content (from non-detectable to 112.5 mg/L) was observed in the anolyte of active MECC reactors, indicating microbially facilitated silicate dissolution from the paper support liberated cations for electrolytic reactions (Table 1). Meanwhile, the turbidity of catholytes increased due to the formation of white suspended solid in the liquid, and white precipitate accumulated on the wall and membrane surface facing the cathode (FIGS. 4A-4C). Both were identified as polymorphous CaCO$_3$ by XRD quantitative crystalline phase analyses (Table 2). These results confirm that CO$_2$ was captured and stored in MECCs in part by forming insoluble carbonate through the reaction with the cations derived from the silicate. Such direct precipitation of carbonate was not observed in a previous abiotic electrochemical system, which could have been due to the low CO$_2$ concentration and lower pH of final solutions (7.6-8.0, soluble bicarbonate dominant).

Figure 3A:
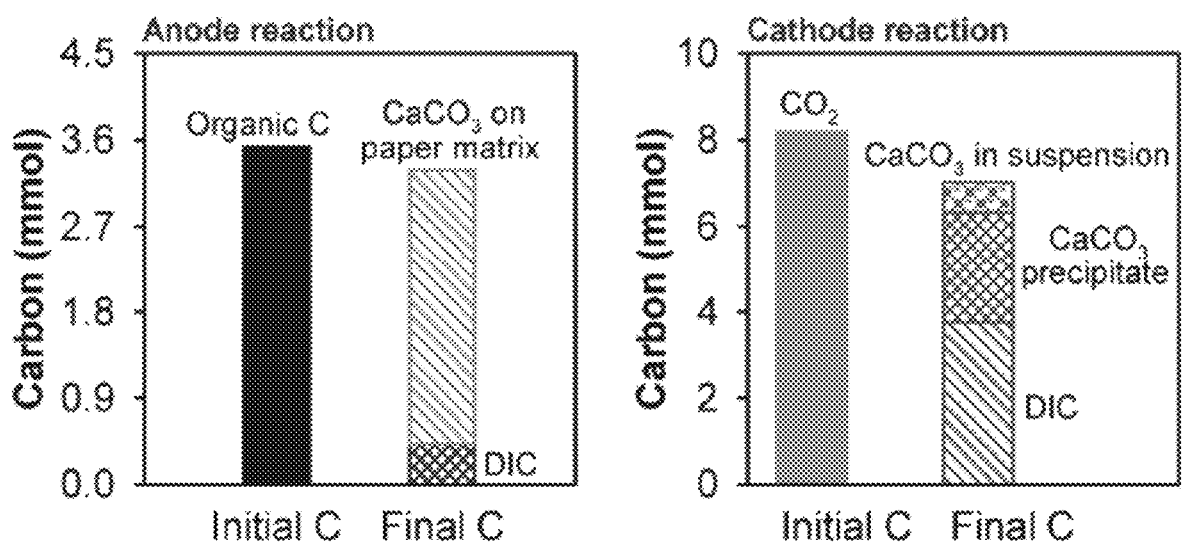
FIGS. 3A-3B are graphs reporting carbon balance and recovery in MECC process using artificial wastewater electrolyte (FIG. 3A) and produced water electrolyte (FIG. 3B). Organic carbon derived from wastewater organic consumption was the only carbon input for anode reaction and externally injected $CO_2$ was the only carbon source for cathode reaction. DIC represents total dissolved inorganic carbon.
Figure 3B:
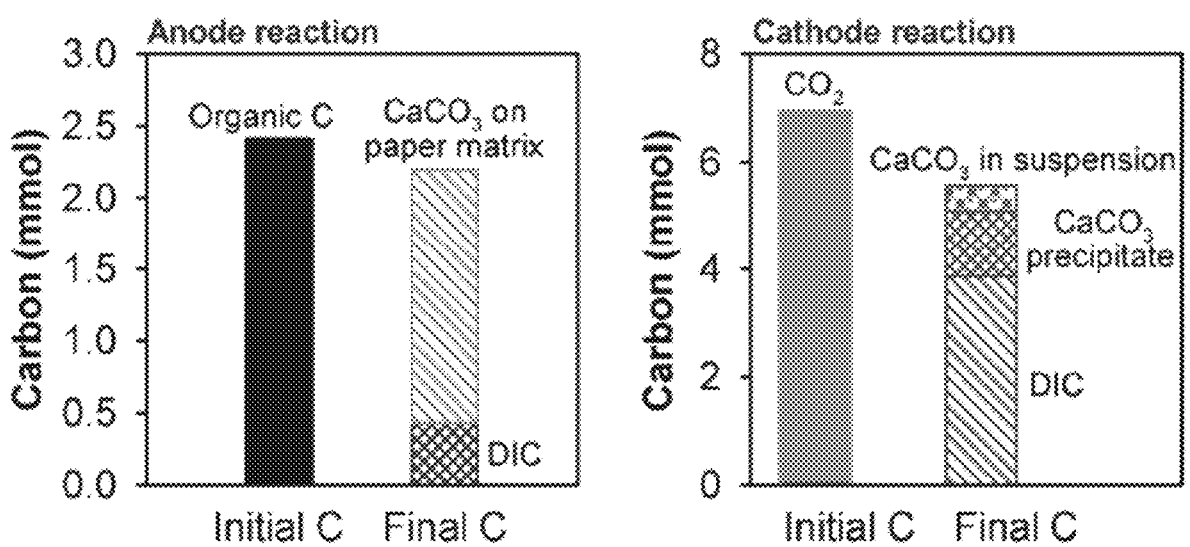

Carbon balance analysis showed a total of 80-93% of the CO$_2$ generated in the anode chamber or artificially injected in cathode chamber was captured in the MECC systems instead of being released to the atmosphere (FIGS. 3A-3B). Specifically, approximately 47% (AW, FIG. 3A) or 30% (PW, FIG. 3B) of the headspace CO$_2$ in the catholyte reservoir was converted to insoluble CaCO$_3$ (FIGS. 3A-3B). In addition, more than half of the CO$_2$ captured existed in the form of dissolved inorganic carbon (DIC). Catholyte filtrate contained a small amount of Ca$^{2+}$ (Table 1), suggesting that the DIC was primarily composed of soluble NaHCO$_3$ and Na$_2$CO$_3$, i.e., the metal cation directly came from the electrolytes, a feature seen previously in abiotic silicate electrolysis. This is further supported by the observation of Na+ transport from the anode chamber to the cathode chamber for charge balance in both AW and PW electrolytes (Table 1).

Figure 3C:
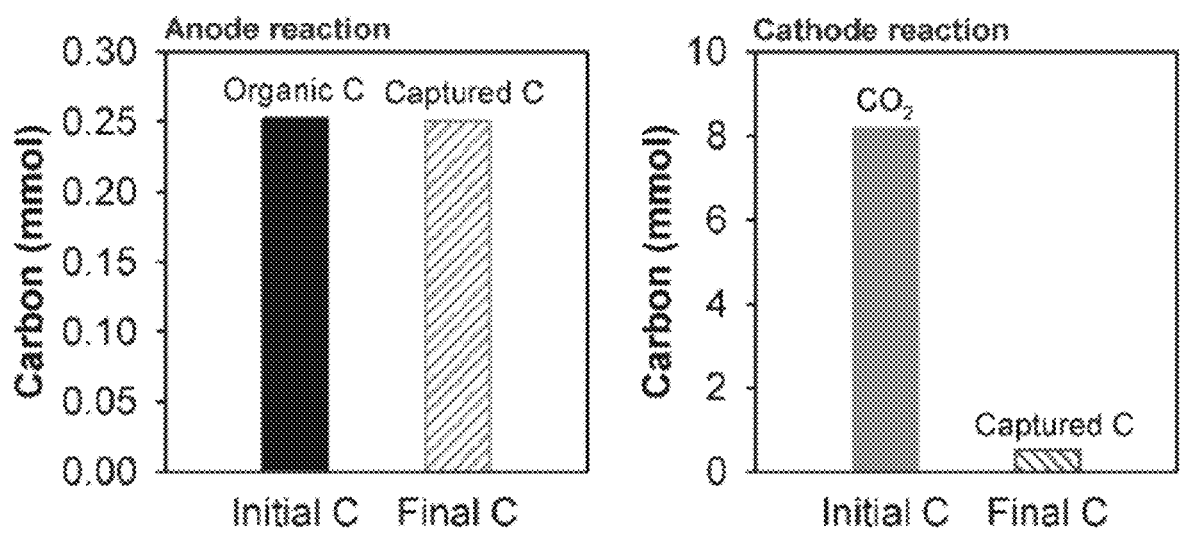
FIGS. 3C-3F are graphs reporting the carbon balance and recovery in abiotic control MECC process using AW electrolyte (FIGS. 3C and 3E) and PW electrolyte (FIGS. 3D and 3F) with an applied voltage of 0.8 V (FIGS. 3C and 3D) or without an applied voltage (FIGS. 3E and 3F).
Figure 3D:
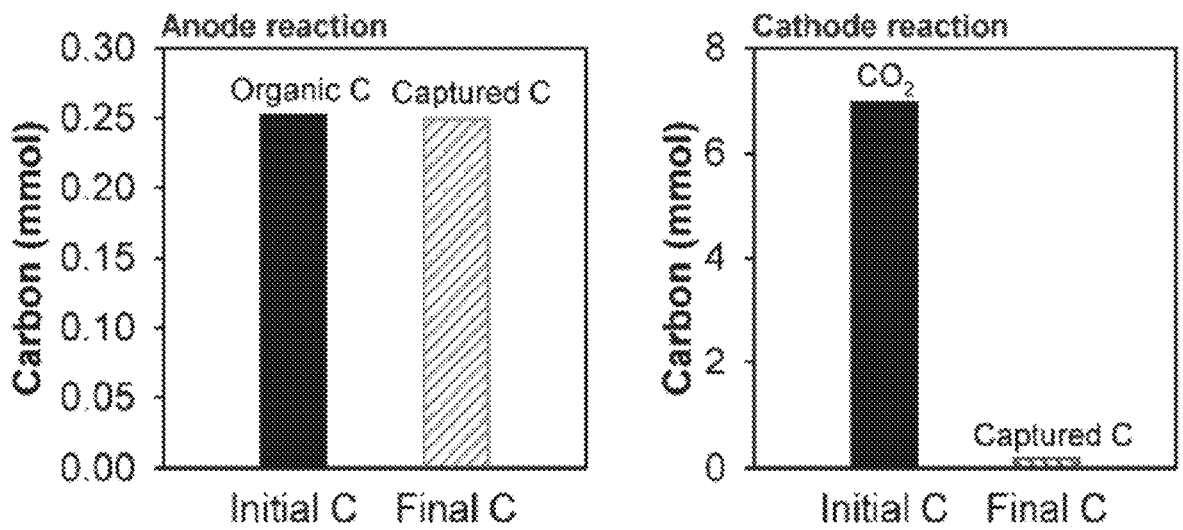
Figure 3E:
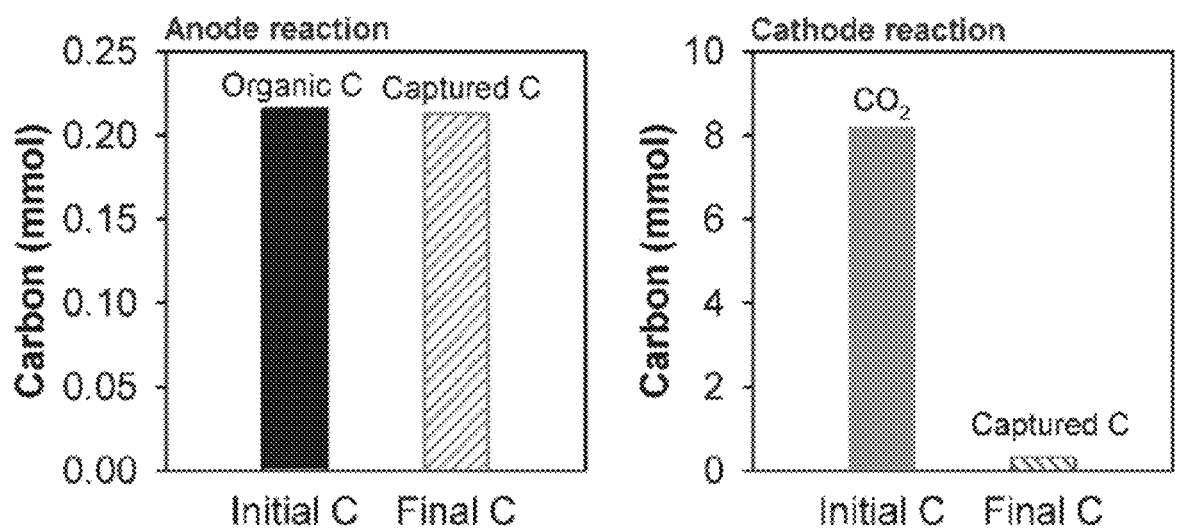
Figure 3F:
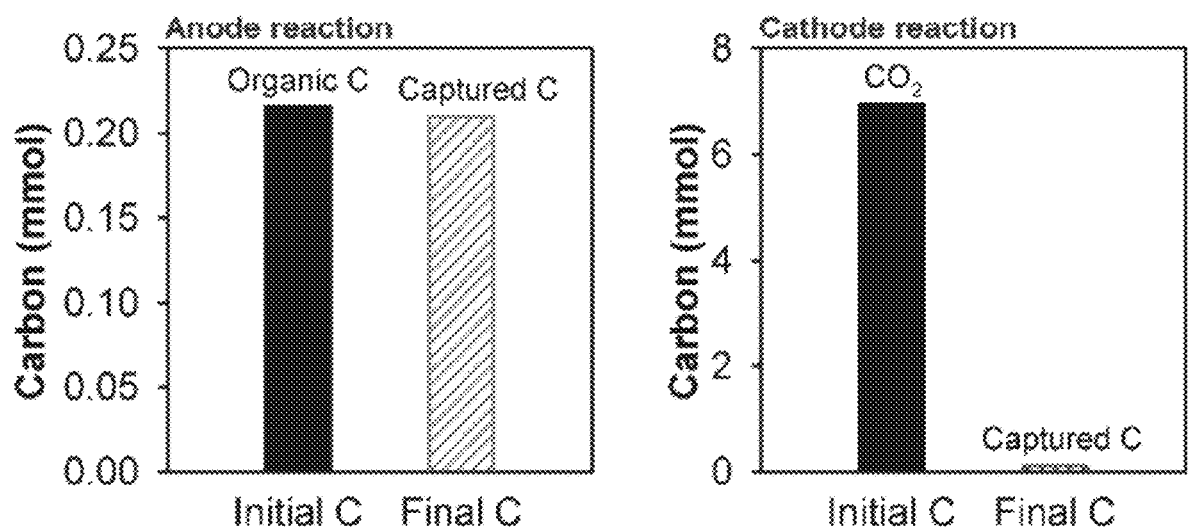

Regarding the capture of $CO_2$ derived from organic degradation in the anode chamber, for both electrolytes, the majority of the carbon (73-81%) was fixed on the silicate paper matrix (FIGS. 3A-3B). This carbon was captured as insoluble $CaCO_3$ through direct reaction of anolyte $CO_2$ with the $CaSiO_3$, because the DIC in the anolyte only accounted for 13-20% of total carbon captured. The results herein were consistently found in replicate experiments (FIG. 3C-3D, Table 3). Relatively little $CO_2$ (0.216-0.252 mmol) was observed in abiotic control anode chambers, presumably derived from the natural decomposition of organics in non-sterile wastewaters. These concentrations were about an order of magnitude lower than in the bioactive reactors (2.41-3.52 mmol). Furthermore, this small amount of carbon was then nearly all captured on the silicate paper matrix (FIG. 3E-3F). For the abiotic control cathode $CO_2$ capture, only 1.5-6.3% of the headspace $CO_2$ was transferred into the catholyte even in the presence of applied voltage. This transfer was apparently solely due to gas-electrolyte equilibrium reactions. No $CaCO_3$ precipitation was found in abiotic controls.

Based on the experimental results and ion analysis, facilitation of $Ca^{2+}$ transport from the anode to the cathode chamber appeared to convert most $CO_2$ to $CaCO_3$ in the cathode chamber, in which pH was consistently higher than 9. Although Na+ was observed to participate carbonate formation, it does not change the stoichiometry in terms of carbon capture and $H_2$ production. Representative reaction equations are provided herein, assuming acetate is the organic substrate, calcium is the main cation, and $CaCO_3(s)$ is the sole carbon end product (ignores $Ca(HCO_3)_{2(aq)}$ production):

Anode Reactions:

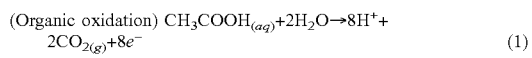

(Organic oxidation) $CH_3COOH_{(aq)}+2H_2O \rightarrow 8H^+ + 2CO_{2(g)}+8e^-$ (1)

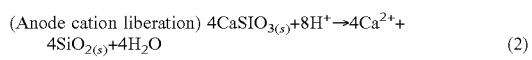

(Anode cation liberation) $4CaSiO_{3(s)}+8H^+ \rightarrow 4Ca^{2+}+4SiO_{2(s)}+4H_2O$ (2)

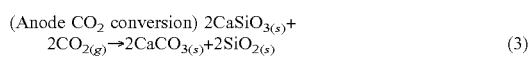

(Anode $CO_2$ conversion) $2CaSiO_{3(s)}+2CO_{2(g)} \rightarrow 2CaCO_{3(s)}+2SiO_{2(s)}$ (3)

Cathode Reactions:

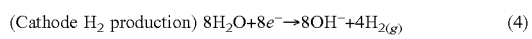

(Cathode $H_2$ production) $8H_2O+8e^- \rightarrow 8OH^- +4H_{2(g)}$ (4)

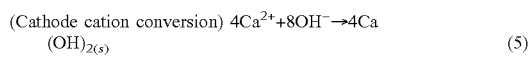

(Cathode cation conversion) $4Ca^{2+}+8OH^- \rightarrow 4Ca(OH)_{2(s)}$ (5)

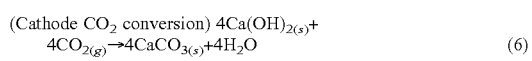

(Cathode $CO_2$ conversion) $4Ca(OH)_{2(s)}+4CO_{2(g)} \rightarrow 4CaCO_{3(s)}+4H_2O$ (6)

Net Reaction:

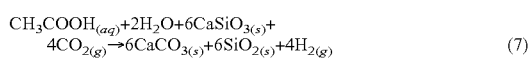

$CH_3COOH_{(aq)}+2H_2O+6CaSiO_{3(s)}+4CO_{2(g)} \rightarrow 6CaCO_{3(s)}+6SiO_{2(s)}+4H_{2(g)}$ (7)

Based on this reaction, for every 6 moles of organic and inorganic carbon captured, there are 4 moles $H_2$ produced. Based on carbon balance, this study shows that up to 93% of the carbon otherwise internally generated and emitted to the atmosphere was captured in the MECC system. VDC is the applied voltage (0.8 V) used to overcome thermodynamic barrier of the reaction, which is much lower than that used in abiotic water electrolysis (1.8-2.0 V). The voltage difference is made up by the microbially facilitated release of chemical energy stored in the wastewater organics.

Example 3: $H_2$ Production and Energy Balance (MECC Reactor 1)

Continuous $H_2$ was produced in the active reactors using either AW or PW electrolyte. High coulombic efficiencies (80-82%) for both electrolytes indicated that the majority of organic substrates were converted to current, which then was used to reduce $H^+$ for $H_2$ production with extremely high efficiencies with the cathodic $H_2$ recovery ranged from 91-95% (Table 4). All of these lead to a high recovery of $H_2$ yield (75-76%) of the theoretical maximum value. A higher $H_2$ production rate was observed from the PW MECC due to the higher current density obtained from the reactor. No $H_2$ was found in abiotic controls even with a same applied 325 voltage of 0.8 V.

Table 4 shows the preliminary energy balance of the MECC systems. The reactors consumed between 72-84 kJ of electrical energy for each mole $CO_2$ captured (excluding pumping energy), which is a significant reduction compared with CCS-type systems. The energy savings was due to energy supplemented from in situ microbial conversion of chemical energy to current. As a result, the $H_2$ produced from the MECCs represent an energy output of 129-146 kJ/mol-C/$CO_2$ converted, which means a net energy gain of 57-62 kJ/mol-C/$CO_2$ converted (Table 4). The energy benefits are found to be even bigger if the calculation includes the energy savings for wastewater treatment. In comparison, the $H_2$ energy produced in abiotic electrochemical systems can only compensate for 30-79% of electric energy input. Electrochemical $CO_2$ capture through silicate dissolution consumed 426-481 kJ/mol-$CO_2$ energy, and energy consumption was >266 kJ/mol-$CO_2$ when using carbonate. The state-of-the-art solid sorbents adsorption or solvents absorption for post-combustion $CO_2$ capture consume ~90 kJ/mol-$CO_2$ and 41-185 kJ/mol-$CO_2$, respectively, and more energy is needed for compression, transport and storage of collected $CO_2$. Moreover, the sorbents/solvents are very costly compared with globally abundant and inexpensive silicates and wastewater.

Example 4: Adaptability of Anode Microbial Community (MECC Reactor 1)

To reveal the impacts of the MECC process on microbial communities under different electrolytes, high throughput sequencing was conducted for the anode biofilm samples obtained from 3 reactors containing AW, PW, and acetate+phosphate buffer, respectively. All three reactors were inoculated with the same sludge. Results show only a slight difference existed among the three bacterial community structures despite different electrolyte conditions in terms of salinity and ion composition (FIGS. 5A-5C). *Geobacter* spp. was found dominant in all samples and accounted for 80-89% of total composition. *Geobacter* spp. has been well studied in bioelectrochemical systems and can live in saline environment. Because *Geobacter* spp. primarily metabolize simple organics such as acetate, the degradation of complex organic matters exist in wastewater may rely on the synergy of a consortium of microorganisms: polymer-degrading bacteria break down complex substrates into simple organic products, so the majority of the exoelectrogens can further convert these products to electrical current.

Example 5: Current Production and Buffer Capacity Formation (MECC Reactor 2)

Figure 7A:
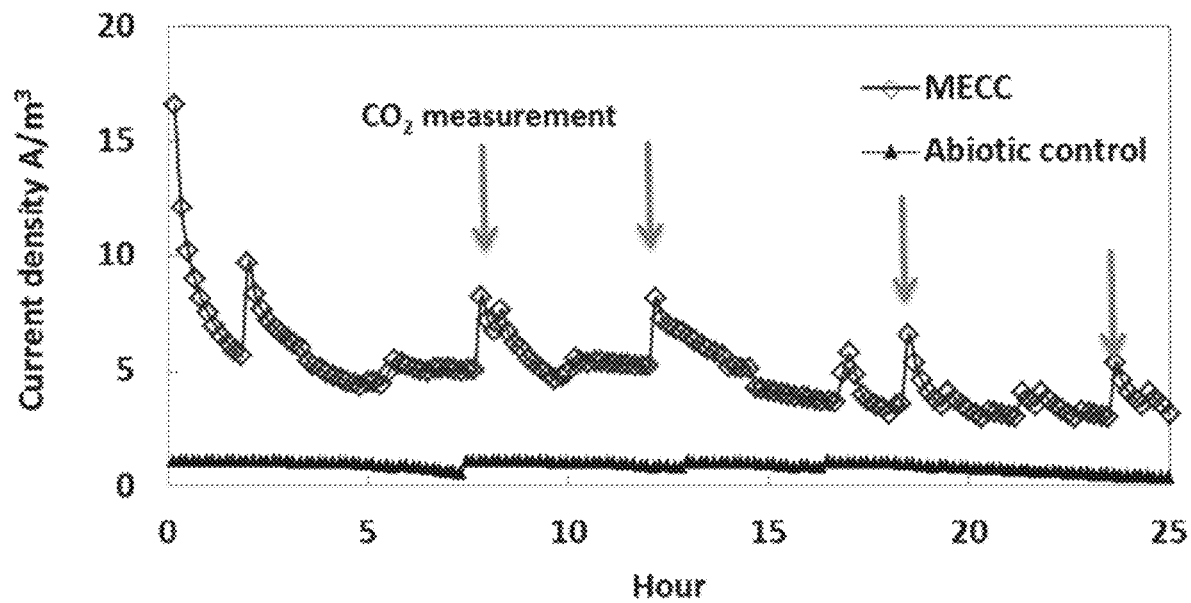
FIG. 7A is a current generation profile during a typical batch of experiments during ambient $CO_2$ capture using the system shown in FIG. 6. Occasional spikes were observed when the reactor operation was interrupted for measurements and $CO_2$ injections. The observed current was much higher than the abiotic control, which was less than 0.7 A/m³.

The current density of the MECC reactor reached approximately 5 A/m$^3$ after 5 h and remained stable during the experiment. Occasional spikes were observed when the reactor operation was interrupted for measurements and $CO_2$ injections (FIG. 7A). This current was much higher than the abiotic control, which was less than 0.7 A/m$^3$ (FIG. 7A), indicating active bioelectrochemical reactions in the MECC.

Figure 7B:
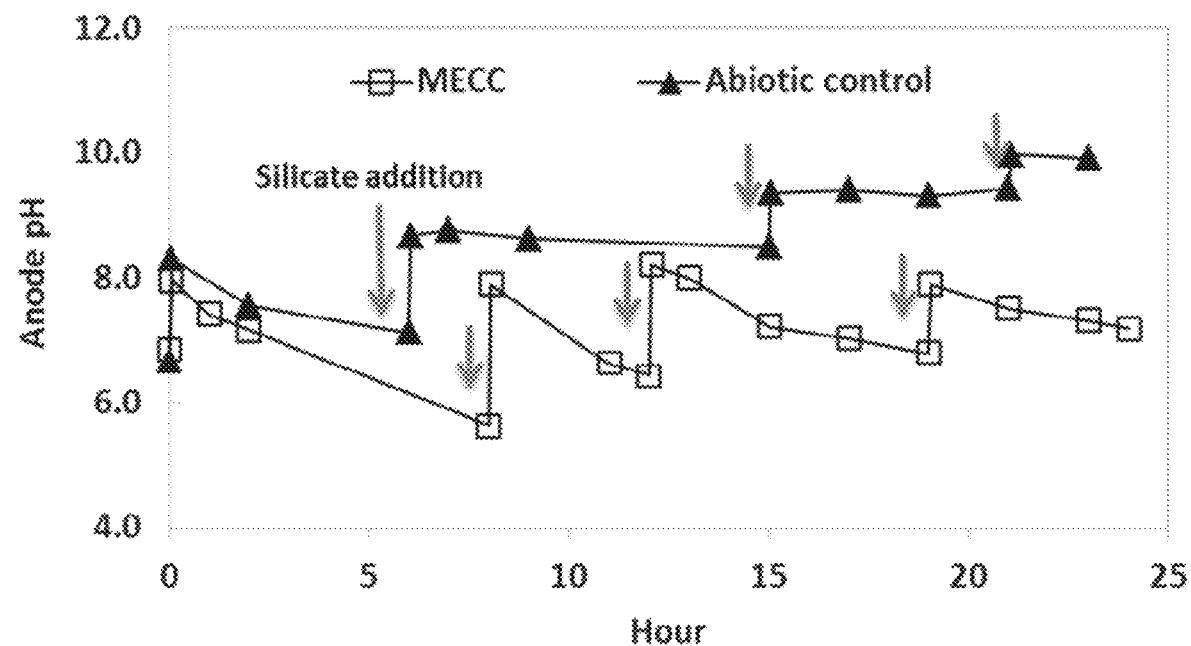
FIG. 7B is a graph reporting pH changes in the anode during the operation of the MECC reactor.
Figure 7C:
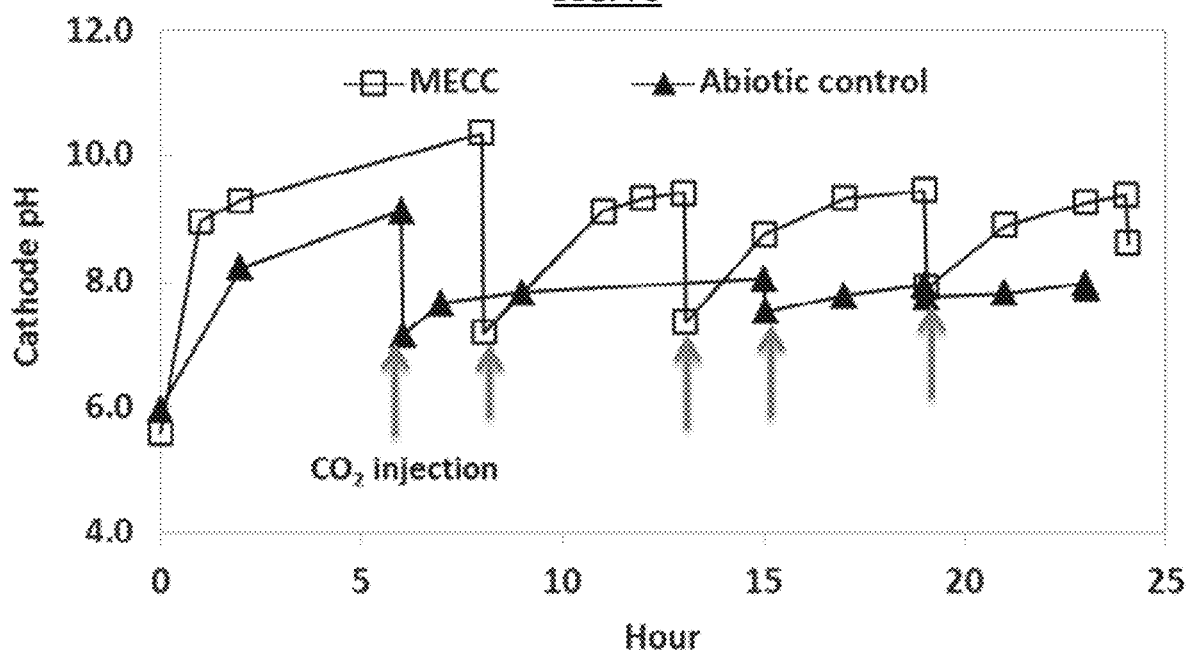
FIG. 7C is a graph reporting pH changes in the cathode during the operation of the MECC reactor.

Cyclic pH pattern was observed in both anode and cathode chambers. Similar to other electrolysis process, the anode pH decreased initially in each cycle due to the proton release during microbial substrate oxidation, but the protons were then consumed during silicate dissolution to release mineral ions, which kept a relatively stable pH overall without the addition of high strength buffers (FIGS. 7B-7C). The MECC anode pH ranged between 7.1 and 7.8 during stable operation, while the pH in the abiotic control increased to nearly 10 due to the lack of biological reaction with the presence of silicate mineral. On the other hand, cathode pH increased at the beginning of each cycle due to the consumption of H$^+$ and release of OH$^-$, but $CO_2$ injection subsequently reduced pH due to the capture and reduction of $CO_2$, which created the carbonate buffer ($HCO_3^-$/ $CO_3^{2-}$). The MECC cathode pH stabilized between 8.2 and 9.4, similar to a previous study using 15% $CO_2$ injection. In contrast, a much smaller pH change in the cathode chamber was observed during the operation of the abiotic control, indicating limited reactions (FIGS. 7B-7C). The capability of keeping stable pH solves a major challenge faced by abiotic or biotic electrolysis process, reduces the cost of buffer solution, and prevents the production of hazardous chlorine gas.

The COD removed in the anode was 139±6 mg/L or 14% during a 24-h batch period. The batch period was determined by $CO_2$ cycling time instead of COD removal, so higher COD removal could be achieved with operation optimization based on traditional MFC practices. Hydrogen gas production was not directly monitored as in previous studies due to the mixing with flushing gas containing large amounts of $N_2$. Instead, $H_2$ recovery was calculated based on the current density using established methods described in Lu, et al., 2015, Environ. Sci. Technol. 49(13):8193-8201.

Example 6: Carbon Capture Efficiency (MECC Reactor 2)

Figure 8A:
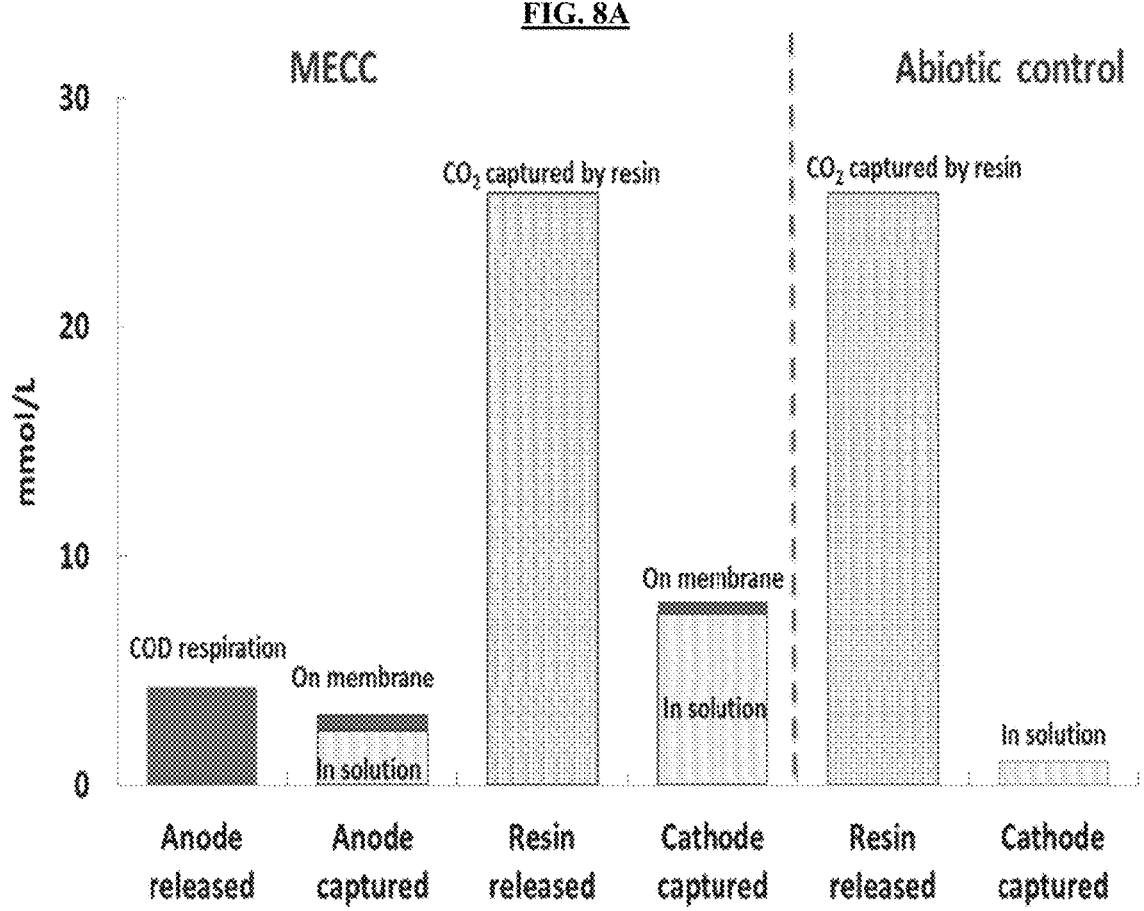
FIG. 8A is a graph reporting $CO_2$ balance in the anode and cathode. The first two bars indicate the $CO_2$ release and capture in the anode chamber, the next two bars show the $CO_2$ capture in the cathode chamber and the last two bars show the $CO_2$ capture in the abiotic control.

In the cathode chamber, 8.00 mmol/L gaseous inorganic carbon ($CO_2$) was captured at the end of the experiment, including 7.48 mmol/L in solution and 0.52 mmol/L as deposits on the cathode side of the CEM (FIG. 8A). In the anode chamber, the inorganic carbon concentration at the end of the experiment was 3.31 mmol/L, including 2.67 mmol/L in solution and 0.63 mmol/L on the anode side of the CEM. The total inorganic carbon captured in the anode accounted for 77% of the $CO_2$ released from acetate oxidation (assuming complete conversion of acetate to $CO_2$) and 29% of the $CO_2$ captured by the ion exchange resin respectively (FIG. 8A). In a follow up experiment, nearly doubled efficiency (51%) was obtained from the cathode by sequentially connecting three 150 mL cathodic solutions for $CO_2$ absorption (FIG. 8A). In contrast, the $CO_2$ captured in the abiotic control only accounted for 4% of the $CO_2$ captured by the ion exchange resin (FIG. 8A).

The results confirm that $CO_2$ was indeed captured in the MECC module as a result of the microbial electrolysis. Compared to the geological storage methods with largely unknown risks, the carbonized wastewater can be a less risky storage media. The carbonized wastewater can also be reused in wastewater treatment processes (e.g., nitrification) for pH adjustment, or as a source of inorganic carbon for autotrophic processes.

Figure 8B:
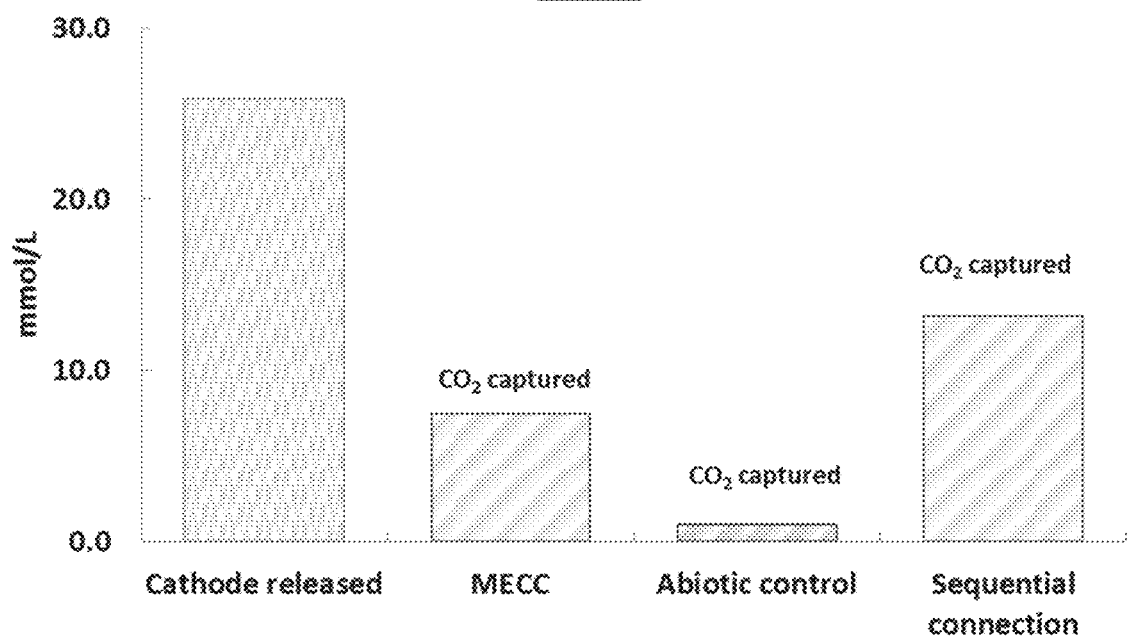
FIG. 8B is a graph reporting $CO_2$ capture efficiency of sequentially connected cathodic solutions.

Two design parameters can be further optimized to improve the carbon capture and storage efficiency of the current design. In one aspect, the cathodic $CO_2$ sorption efficiency can be further optimized. Currently, only 29% of the $CO_2$ released by the ion exchange resin was captured by the MECC module. This efficiency can be improved by increasing the MECC $CO_2$ capture efficiency that matches up with the resin $CO_2$ conversion rate. This was confirmed by an efficiency increase from 29% to 51% when increasing cathode solution from 150 mL to 450 mL (FIG. 8B). In another aspect, the ion exchange resin had a diameter of approximately 600 μm, which could be further grinded to increase the $CO_2$ adsorption capacity. Such change would also reduce the size of the $CO_2$ capture module and offer greater flexibility in the design and operation of future scale-ups.

Example 7: Liberation and Migration of Cations for Carbon Capture (MECC Reactor 2)

At the end of the experiment, the calcium ion concentrations increased from 0.30 ppm to 111.37 ppm in the anode chamber, and from 0.005 ppm to 23.46 ppm in the cathode chamber (Table 5). This indicates that the calcium ions were liberated by the protons generated in the anodic microbial activities and migrated to the cathode for carbon capture as designed. In certain embodiments, the membrane design can be replaced with a membrane-less design, upflow operation and/or membrane surface coating.

Sodium and potassium migration from the anode to the cathode was also observed. The sodium ion concentration increased by 81 ppm in the cathode and decreased by 173 ppm in the anode; whereas the potassium ion concentration increased by 27 ppm in the cathode and decreased by 21 ppm in the anode (Table 5). This indicates competition between the calcium ion and sodium and potassium ions for $CO_2$ capture. Without wishing to be limited by any theory, automated amendment of calcium minerals can help ensure the availability of calcium ions and minimize undesirable ion migration.

Example 8: Scale-Up Potential of Wastewater Carbon Capture (MECC Reactor 2)

Figure 9:
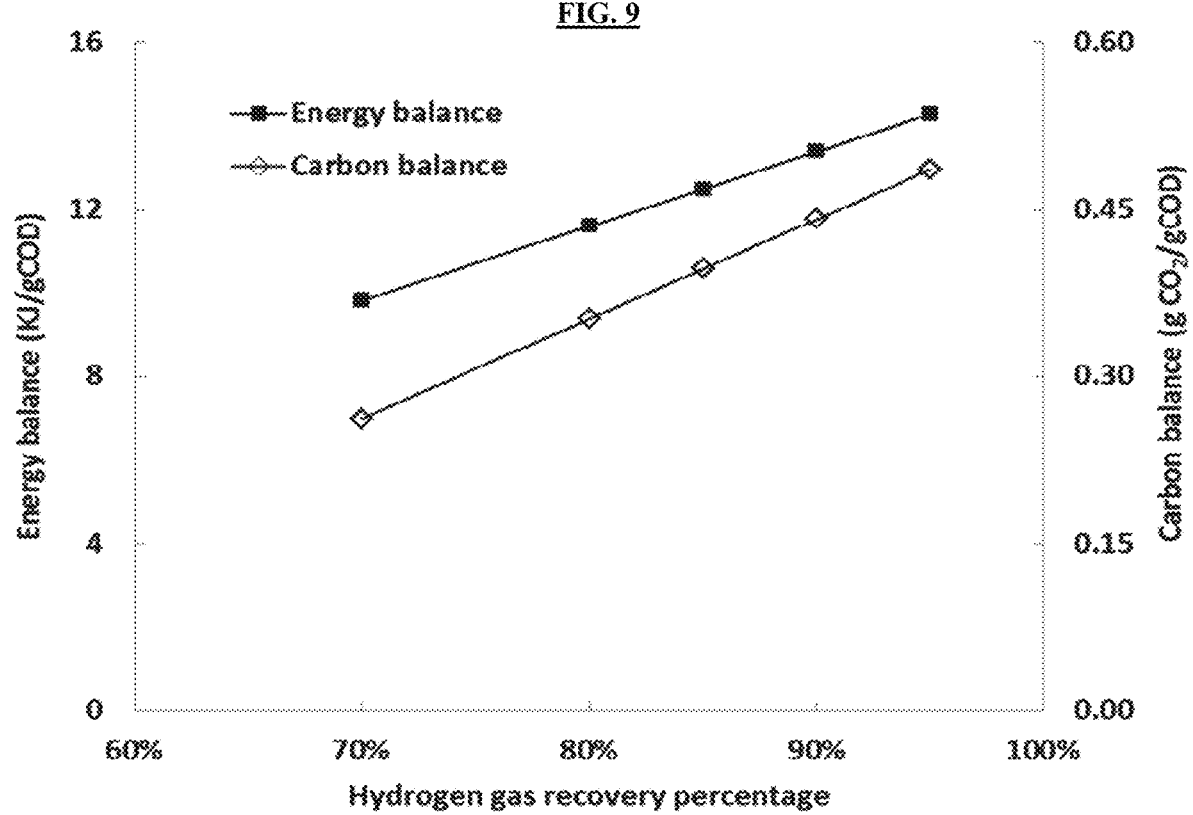
FIG. 9 is a graph reporting $CO_2$ and energy balance as a function of hydrogen gas recovery percentage.

The sensitivity analysis suggests that the MECC process can be an energy positive and carbon negative process. As the hydrogen gas recovery efficiency improved from 70% to 95%, the energy gain increased from 9.8 to 11.3 kJ/gCOD and the $CO_2$ capture efficiency increased from 0.26 to 0.49 g$CO_2$-capture/gCOD (FIG. 9). This indicates that improving the hydrogen recovery efficiency of MECC is important to efficient energy production and carbon capture, which is an active area of research. Assuming that the average BOD of domestic and industrial wastewater were 0.35 and 0.5 g/L respectively (Table 6), the total biodegradable BOD in the US was estimated at over 170 million tons/year. Assuming a carbon capture efficiency of 0.40 g$CO_2$-capture/gCOD is achieved, over 68 million tons of $CO_2$ could be captured in US's wastewater treatment process annually (Table 6). In California, the auction price of $CO_2$ was approximately $12/ton $CO_2$ in November, 2015. If the entire US adopted a similar carbon tax rate to help achieve its carbon mitigation goals, the $CO_2$ captured in wastewater treatment would have a tax value of over 800 million USD/year (Table 6). This suggests the significant potential economic value in using wastewater treatment plants for carbon capture and storage, not to mention the additional benefits of added alkalinity in wastewater to save on alkaline uses in nitrification and the added value of calcium carbonate that can be potentially sold as construction materials. The tax value of the US's wastewater $CO_2$ capture will further increase to over 1 billion USD/year, if the US was to adopt similar tax rates that the UK and British Columbia governments are implementing (Table 6). The costs of MECC fabrication and operation are not included in this study. Major cost reductions can be achieved by reducing electrode distances, removing expensive membranes, increasing solution conductivity, and optimizing configuration and operation.

Example 9: MECC

Every year, approximately total of 16 trillion gallons (61 billion $m^3$) of municipal wastewater is treated in the U.S. alone, with 75% treated by centralized POTWs. The potential carbon and energy benefits can be remarkable for these utilities. Using the MECC technology, a potential of 50.3 million tons of $CO_2$ can be sequestered and 1.5 million tons of $H_2$ (60.5 terawatt hour energy) can be produced per year in the U.S. alone, assuming wastewater with moderate organics concentration of 200 mg/L COD. Moreover, the carbonate products can be reused on site for wastewater alkalinity compensation, which can be especially beneficial for wastewater microbial aerobic nitrification and improvement of activated sludge settling properties. It is also feasible to preferentially generate insoluble $CaCO_3$ from silicate through operation adjustments, so solid products can be separated from solution to reduce total dissolved solid (TDS) and reuse them for alkalinity compensation or other uses (e.g. recycle of $CO_2$ as a feedstock for cement plants).

Experimental results showed increased conductivity and buffer capacity facilitates the $CO_2$ capture and conversion, so the addition of silicate or other natural minerals is beneficial for low conductivity wastewater, depending on the specific silicates solubility. Because most common rocks have appropriate compositions to provide alkalinity needed for $CO_2$ conversion, studies show that the global silicate mineral deposit is so abundant for carbon sequestration that it can provide virtually low cost and unlimited supply for both overall mass and geographic availability. For example, the Columbia River basalts in the U.S. alone is estimated at over 500 million Gt, which is 10,000 times that needed to remove all the cumulative anthropogenic emissions of 20,000 Gt of $CO_2$.

Saline wastewaters are suitable candidates due to its high conductivity and buffer capacity. For example, it is estimated that each year nearly 880 billion gallons (3.3 billion $m^3$) of flowback and produced water are generated from oil and natural gas industry in the U.S., and the treatment and reuse of such water becomes an emerging need, because the current practice of long-distance transportation and deep well injection poses multiple health and safety concerns. Produced water contains high concentrations of salt and biodegradable hydrocarbon, which is a useful source for this technology. High concentrations of metal cations, such as $Ca^{2+}$, $Mg^{2+}$, $Na^+$, $Sr^{2+}$, and $Ba^{2+}$, are already present in these solutions, which may facilitate carbonate precipitation. The process also improves the removal of TDS, which has been a huge challenge for traditional filtration based technologies for produced water reuse. Seawater can also be used, especially when it is associated wastewater treatment and desalination processes.

In certain embodiments, the MECC technology transforms wastewater treatment plant from a carbon emitter to a carbon sink. Not only the process captures the $CO_2$ generated during the wastewater treatment process, it can capture more $CO_2$ from other sources. This is significant for the wastewater industry as well as other industries with significant carbon emissions. Wastewater plants are commonly co-located with big carbon emitters such as power plants, cement plants, and refineries. This presents a huge opportunity for both industries, as the wastewater facility can help capture and sequester the $CO_2$ emitted from the nearby point source and generate carbon credits, and the emitter can save costs by avoiding the use of expensive and energy intensive CCS systems yet still meet EPA mandates on carbon pollution reduction, such as the recently implemented Clean Power Plan for existing power plants in 2014. One the other hand, the waste heat generated from neighboring plants can be used for acceleration of microbial reaction process in MECC to save more applied energy. In addition, many wastewater facilities are located on the coast and discharge billions of gallons of treated effluent to the ocean. If the MECC process is integrated into these facilities and discharges metal hydroxide- or carbonate-rich effluent to the ocean, excess $CO_2$ can be subsequently captured and stored by using >70% surface area of the earth as a natural, passive $CO_2$ absorber, an alternative that should be cheaper and simpler than forcing air through an air $CO_2$ absorbing device using high-energy machinery. In any case, such alkalinity addition to the ocean would be helpful in maintaining the $CaCO_3$ saturation state of seawater, thus mitigating the effects of ongoing ocean acidification on marine shellfish and corals. Furthermore, the conversion of $CO_2$ to ocean alkalinity provides effective, long-term carbon storage; the residence time of $Ca^{2+}$ and $Mg^{2+}$ (and by inference, that of balancing $HCO_3^-$ and $CO_3^{2-}$ ions) in seawater is ≥1 Myrs.

Preliminary economic analysis for lab-scale MECC systems, using PW electrolyte, follows:

Capital: Since 9 tons carbon (C) would be captured per 1 ton (t) $H_2$ produced, estimated capital investment of microbial electrolysis is $528/t-COD,1 and $H_2$ yield for organic wastewater is 0.125 t-$H_2$/t-COD, MECC system capital cost would be 528/0.125×⅑=$469/t-C captured.

Operation and maintenance: Assuming additional energy required for acceleration of $CO_2$ contacting and materials (liquid and solids) transfer is 60 kJ/mole-C captured, the total energy cost is 60+84=144 kJ/mol-C, which equates to 3.3 MWh-electricity/t-C. If the renewable electricity cost is $64/MWh (2012 levelized cost of electricity produced wind), energy cost would be $211/t-C captured. Each ton of carbon captured will consume 9.7 t $CaSiO_3$ (unit cost of $20/t including extracting, grinding and delivery expenses), resulting in a cost of $194/t-C captured. Equipment maintenance are assumed to be 3% of capital cost or $14/t-C captured. The wastewater is assumed free.

Potential cost offsets: The produced $H_2$ revenue would be 1500×⅑=$167/t-C captured at a $H_2$ market value of $1500/t-$H_2$. Assuming the cost of aerobic wastewater treatment (sum of capital and operational costs) is $528/t-COD, the offset due to avoiding wastewater treatment would be $469/t-C captured.

Thus, the total carbon sequestration cost of this system is 469+211+194+14−167−469=$252/t-C captured or equivalent $69/t-$CO_2$ captured. The typical electric energy consumption for aerobic wastewater treatment is assumed as 600 kWh/t-COD. If this energy is produced from fossil fuel (coal) use, there would be 600/0.125×2.88×10$^{-4}$=1.4 tons of carbon are avoided per ton H$_2$ produced in MECC based on H$_2$ yield (0.125 t-H$_2$/t-COD) and 2.88×10$^{-4}$ t-C emission/kWh electricity produced in a coal power plant. Assuming another 2.5 tons of carbon are avoided per ton H$_2$ produced via replacing commercial nature gas reforming with carbon-negative electrolysis here for bulk H$_2$ production, then a total of 9+1.4+2.5=12.9 t-C mitigated/t-H$_2$ produced, or 12.9×1/9=1.43 t-C mitigated/t-C captured. The net cost per t of carbon mitigated is then $252/1.43=$176/t-C mitigated or equivalent $48/t-CO$_2$ mitigated.

This calculation thus shows that the net cost for mitigating one ton of CO$_2$ could be $48/t-CO$_2$ mitigated, which was calculated based on a combination of CO$_2$ capture cost (capital plus operation cost), potential cost offsets (revenue of H$_2$ and wastewater treatment), and avoided CO$_2$ emission through reduced fossil fuel consumption for wastewater treatment and commercial H$_2$ production (nature gas reforming).

This net cost is well below the $70-270/t-CO$_2$ estimated for coal power plant with geological storage CCS, and also below the cost for direct air CO$_2$ capture using chemical/thermal methods (on the order of $1000/t-CO$_2$) or abiotic electrolytic dissolution of silicate ($86/t-CO$_2$). The CO$_2$ mitigation capacity and efficiency of MECC can be further improved through the selective formation of bicarbonate, which per mol of cations captures and stores twice the amount of CO$_2$ than does carbonate.

As demonstrated herein, this study successfully demonstrated that wastewater can be used for ambient CO$_2$ capture and storage using microbial electrolysis coupled with moisture-driven ambient CO$_2$ capture. An overall carbon capture efficiency of 0.49 gCO$_2$/gCOD was achieved in the lab study.

Example 10: Electrolysis Enhanced Metal Liberation from Fly Ash

Metals such as Ca$^{2+}$ and Mg$^{2+}$ are impurities in fly ash that negatively affect its reuse for geopolymer cement production. However, these alkaline earth metals can form carbonate products for electrolytic CO$_2$ capture and mineralization. To investigate the feasibility of electrolytic leaching of alkaline earth metal from fly ash, a baseline experiment was firstly conducted to characterize its spontaneous dissolution in water without electrolysis.

Figure 11A:
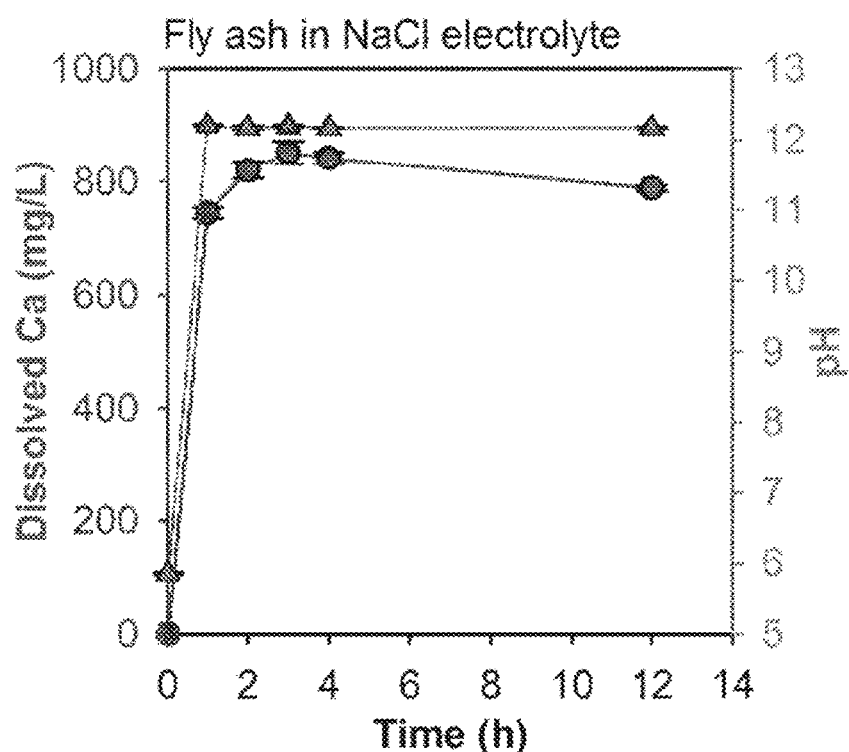
FIGS. 11A-11B are graphs reporting changes in dissolved $Ca^{2+}$ concentration and pH in electrolyte based on spontaneous dissolution without electrolysis. The mixture of fly ash (18 g/L) and electrolyte was stirred at 250 rpm.
Figure 11B:
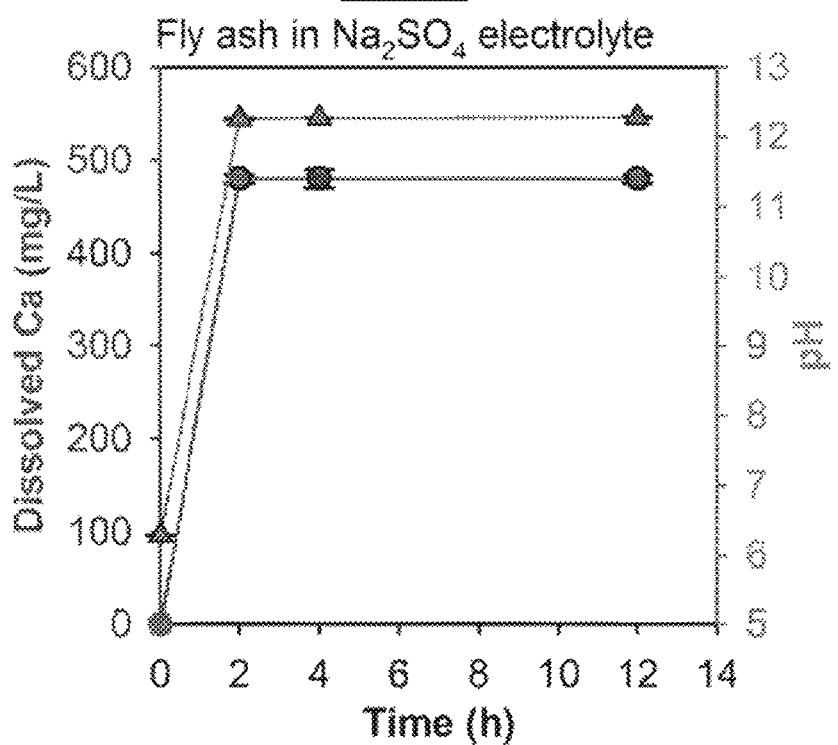
Figure 12A:
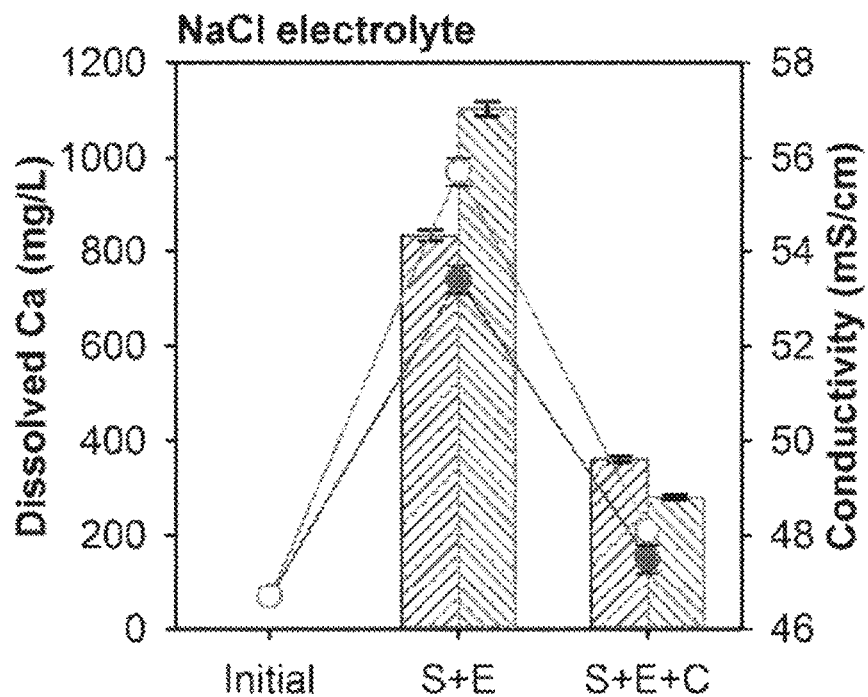
FIGS. 12A-12B are graphs reporting the comparison of the dissolved Ca concentration (bars) and conductivity (lines) changes between zero-voltage control and electrolytic carbonation in NaCl (FIG. 12A) and $Na_2SO_4$ (FIG. 12B) electrolytes. S: Stirring fly ash mixture and electrolyte at 250 rpm for 2 hours; E: Electrolysis of fly ash at a voltage of 3.5 V or 0 V (control) for 1 hour; C: Carbonation of electrolyte by flushing with 15% $CO_2$.

The results showed that nearly all dissolution (dissolved Ca as an indicator) occurred in the first 2 hours in both electrolytes (FIGS. 11A-11B), so for following experiments a 2-hour pre-dissolution process was used before active voltage was applied for electrolysis. In the NaCl electrolyte, dissolved Ca concentration increased from 0 to 833 mg/L (FIG. 12A, column graphs) with pre-dissolution only and no applied voltage (0 V). The corresponded solution conductivities increased from 46.7 to 53.4 mS/cm (FIG. 12A, line graphs), and the pH increased from 5.85 to 12.21. Compared with dissolution without external voltage, the electrolytic dissolution under 3.5 V showed 32.4% increase in Ca dissolution, resulted in a final concentration of 1103 mg/L. Higher increases in conductivity (from 46.7 to 55.7 ms/cm) and pH (from 5.85 to 12.29) were observed as well. When both solutions with liberated Ca reacted with CO$_2$ for carbonation, the dissolved Ca concentration in solution dramatically decreased to 281-361 mg/L in both cases due to the formation of CaCO$_3$ precipitate (FIG. 12A).

This electrolytically accelerated Ca recycle process led to multiple benefits, including CO$_2$ capture, CaCO$_3$ production, and purification of fly ash used for building materials. There was a fraction of the calcium in fly ash that was not liberated, which is believed due to the lower efficiency of the oxygen selective electrode (OSE) (Nafion+graphite) used in this proof-of-concept study (Table 7). Nafion film was used to electrostatically repel the Cl$^-$ from the anode to enhance H+ generation, so Cl$_2$ production can be avoided, which is not the case of SO$_4^{2-}$. In certain embodiments, higher performance OSE, such as manganese-molybdenum oxide electrode specially developed for saline water electrolysis, can be used to improve efficiency.

Figure 12B:
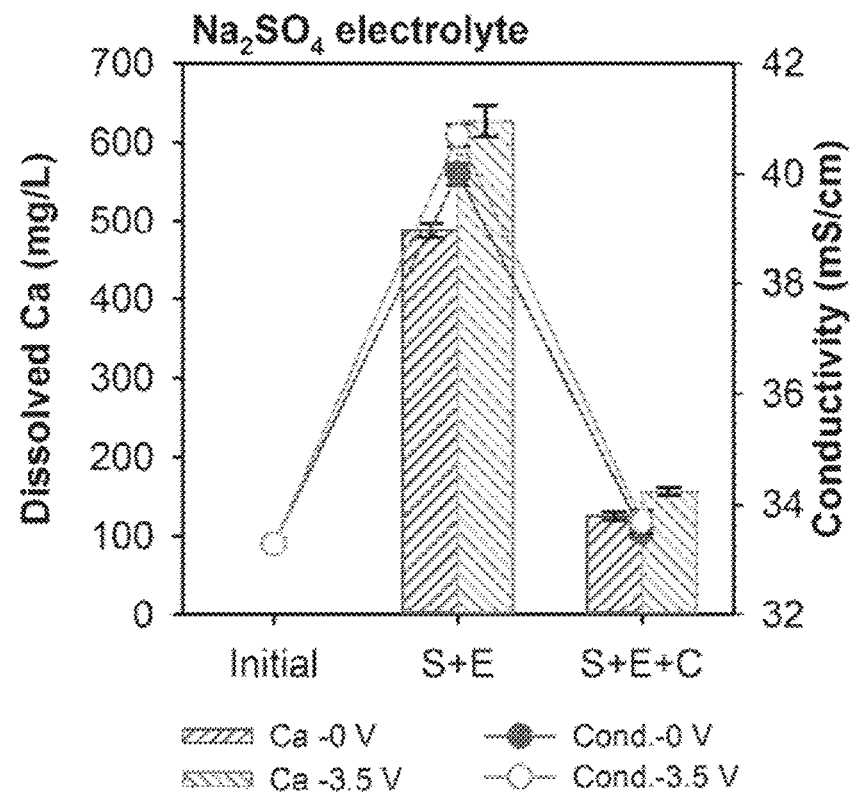

A similar dissolution trend was found when using Na$_2$SO$_4$ as the electrolyte, and the electrolysis enhanced Ca liberation by 28.5% compared with no-voltage control (FIG. 12B). However, the level of Ca liberation was lower than that in the NaCl electrolyte, with 488 mg/L and 627 mg/L Ca dissolved in the solution under 0 V and 3.5 V, respectively. This is likely linked to the abundant SO$_4^{2-}$ in solution, which might recombine with Ca$^{2+}$ to form low solubility solid CaSO$_4$.

Figure 13B:
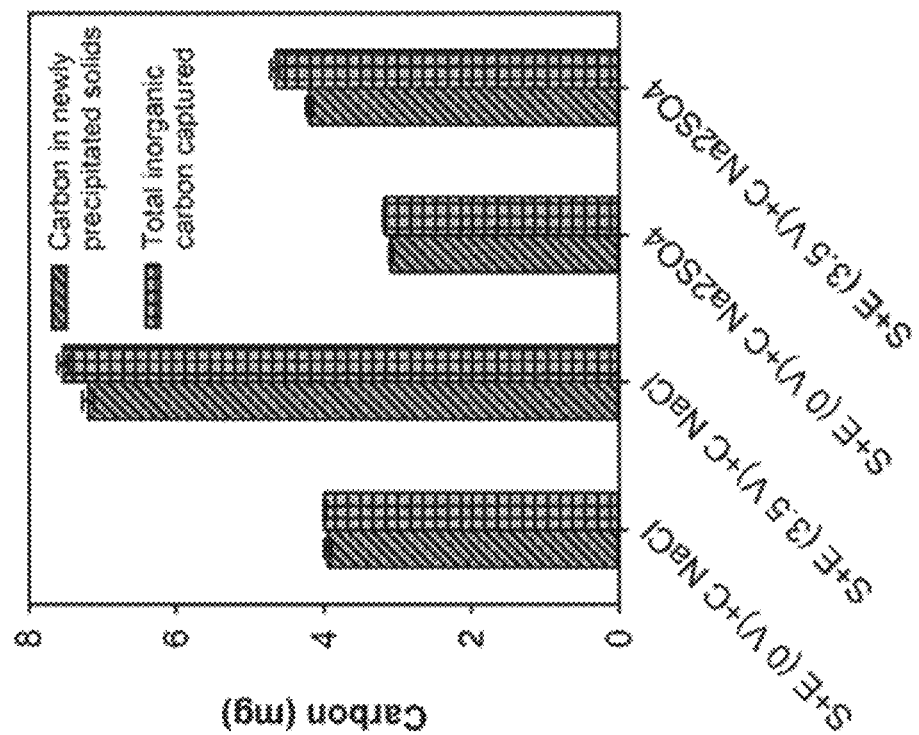
FIGS. 13A-13B are graphs reporting calcium (FIG. 13A) and carbon (FIG. 13B) balance during electrolytic carbonation using both NaCl and $Na_2SO_4$ electrolytes. S: Stirring fly ash mixture and electrolyte at 250 rpm for 2 hours; E: Electrolysis of fly ash at a voltage of 3.5 V or 0 V (control) for 1 hour; C: Carbonation of electrolyte by flushing with 15% $CO_2$.
Figure 13A:
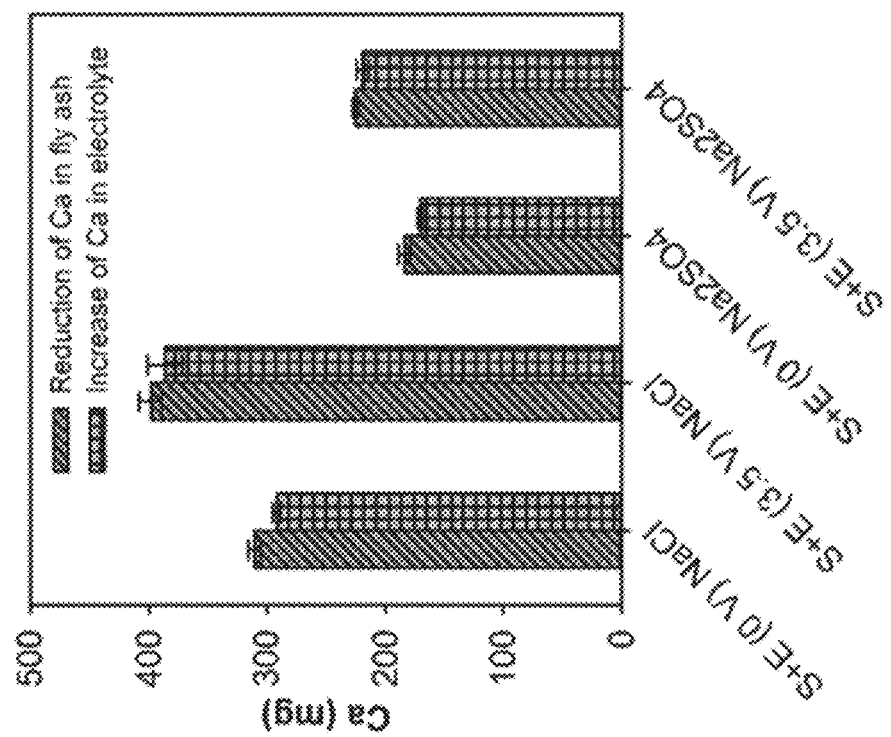
Figure 14:
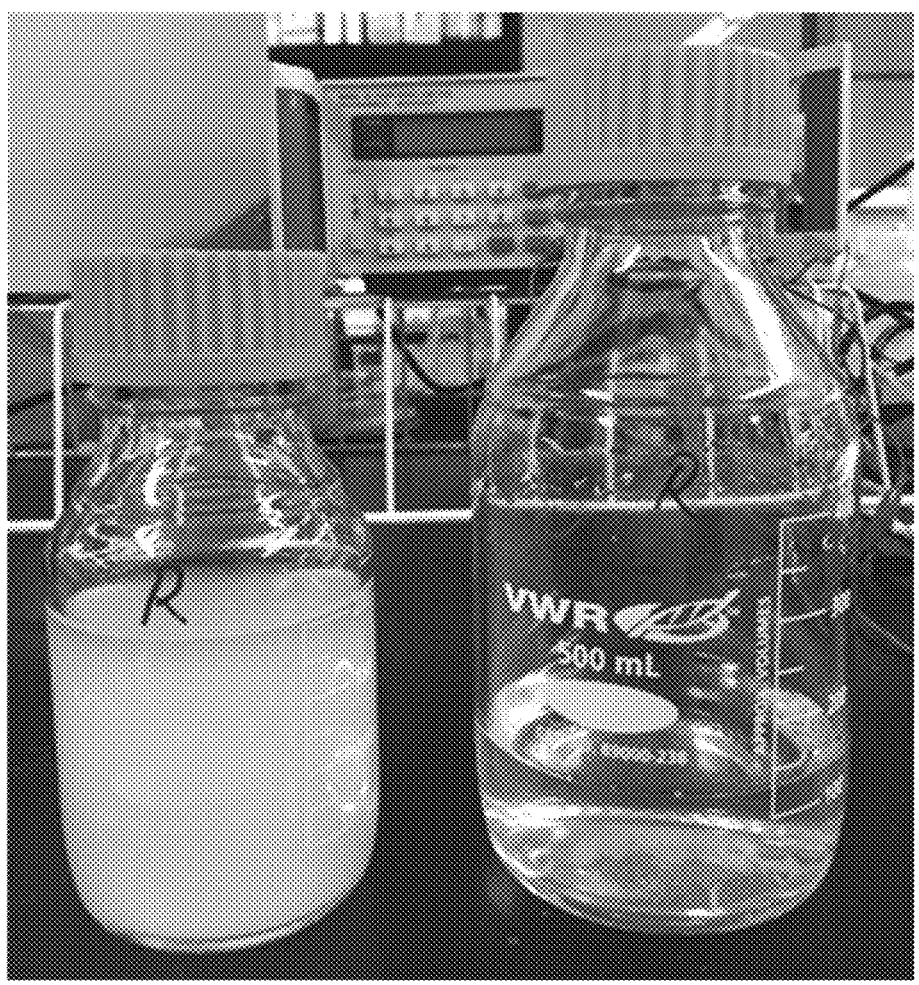
FIG. 14 is a photograph showing a white precipitate in the electrolyte after carbonation with $CO_2$.

Example 11: High Recovery Observed During Dissolution-Carbonation Cycle Using Fly Ash The synergy between enhanced fly ash purification and CO$_2$ capture using electrolysis is linked by the conversion of metal ions embedded in the fly ash to carbonate precipitates. FIGS. 13A-13B show the conversion efficiency of Ca in different conditions. In all cases, the majority of the Ca (>90%) liberated from fly ash was converted to CaCO$_3$ after carbon capture. Specifically, FIG. 13A shows that Ca embedded in the fly ash was liberated into the electrolyte and the external voltage increased the dissolution level. FIG. 13B shows the electrolytic carbonation captured more than 89% of the CO$_2$ than the zero-voltage control. The carbon mass balance shows that between 90-99% of the total inorganic carbon (TIC) captured was embedded in newly precipitated solids after carbonation. This minimizes the soluble bicarbonate production and increases the possibility of physical separation and reuse of the carbonation product. This is confirmed by XRD measurements, which show that the composition of precipitate was CaCO$_3$ with purity of 97.9-99.6%, meeting the purity requirement (>97%) of industrially used chemicals (Table 8, FIGS. 11A-11B, 14). Nearly zero Mg liberation was observed during the experiment (Table 9), which was understandable due to its low content, and the results were consistent with a previous study showing Mg release from fly ash only became significant when pH<8.

Example 12: Capacities of CO$_2$ Sequestration and Mitigation and Energy Expenditure Electrolysis (3.5 V across 1Ω resistor) nearly doubled CO$_2$ sequestration capacity from 9.75 to 18.42 kg-CO$_2$/t-fly ash in the NaCl electrolyte compared with the control. A smaller enhancement (46%) was observed in the Na$_2$SO$_4$ electrolyte, with the capacity increased from 7.79 to 11.38 kg-CO$_2$/t-fly ash (Table 10). These values are comparable with the results obtained using ammonia slat indirect carbonation and higher than studies carried in similar aqueous solution under ambient conditions (7.66-8 kg-CO$_2$/t-fly ash).

To determine the actual CO$_2$ mitigation capacity of the process, a broader carbon benefit was calculated by including the avoided CO$_2$ release associated with fossil fuel electricity consumption (Table 11). Another major carbon benefit is the avoided $CO_2$ emission by substituting current commercial $CaCO_3$ with the produced renewable $CaCO_3$. Although the use of purified fly ash residue generated from this process for geopolymer cement production can avoid huge $CO_2$ emission produced from traditional Portland cement industry, this value was not included due to the large variation and complexity reported by different studies.

Current Portland cement production emits approximately 0.95 tons of $CO_2$ for every ton of cement produced, and research demonstrated that fly ash based geopolymer could reduce 80-90% $CO_2$ emission during production or 44-64% reduction during the whole life cycle. The $CO_2$ mitigation capacity by electrolytic carbonation was higher than or equal to its sequestration capacity (Table 10), suggesting that small electricity consumption for electrolysis did not impact the overall carbon benefit. In contrast, the use of renewable energy (waste heat, solar or wind) for electrolysis will further increase $CO_2$ mitigation capacity. The energy expenditure in electrolytic carbonation was 24.4-36.3 kJ/mol-$CO_2$ for $CO_2$ sequestration and 19.4-29.3 kJ/mol-$CO_2$ for $CO_2$ mitigation (Table 10), which are lower than that of 41-185 kJ/mol-$CO_2$ consumed by the state-of-the-art sorbents adsorption or solvents absorption for post-combustion carbon capture and storage (CCS). The energy consumption for stirring was not included in calculation for energy expenditure in this laboratory test. Stirring used to increase mass transfer can be powered by waste low-grade heat from circulating cooling water and flue gas. The solid (carbonate)/liquid separation can be conducted by gravity to avoid additional energy consumption.

Figure 15A:
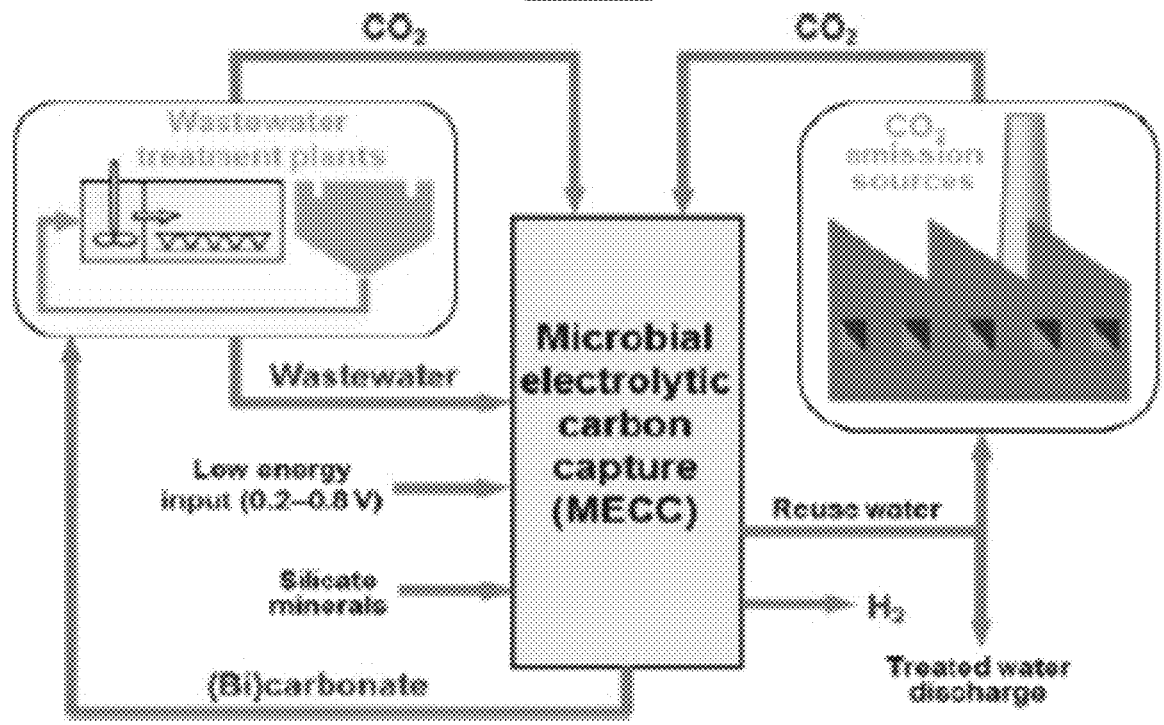
FIG. 15A illustrates a non-limiting set-up for a microbial electrolytic carbon capture operation.
Figure 15B:
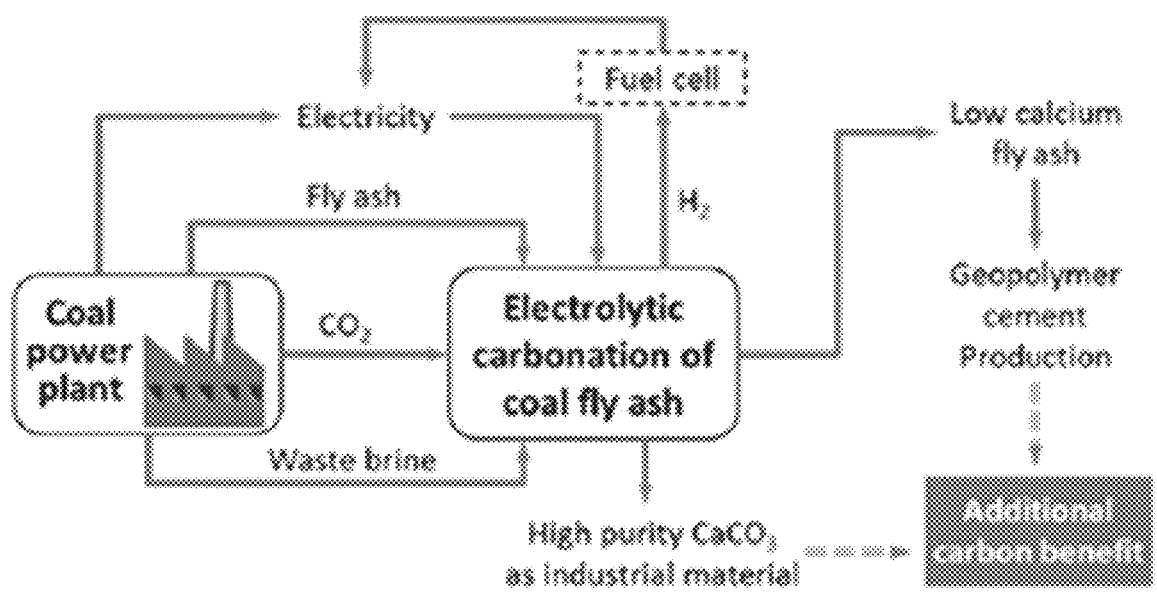
FIG. 15B illustrates a non-limiting set-up for a coal fly ash electrolytic carbonation operation.

An advantage of the electrolytic carbonation of coal fly ash for $CO_2$ sequestration is that all the materials needed for the process are available onsite of a power plant, and almost all of them are waste materials that need treatment anyway (FIG. 15B). Unlike conventional post-combustion CCS technologies, this process does not need high-cost sorbent or long-distance $CO_2$ transportation, and it avoids the toxic chemicals used in indirect fly ash carbonation. The reactions occur in ambient temperature and pressure that reduce operational cost and safety concerns. Such electrochemical method is more efficient than traditional fly ash carbonation methods because it synergizes the metal dissolution and $CO_2$ capture through automatic pH gradient generated in the system, while other processes largely depend on spontaneous dissolution that is limited by continuous pH decline due to $CO_2$ dissolution. In addition, the resulting products of high purity of $CaCO_3$ and purified low calcium fly ash residue can be renewable materials for industrial utilization. Furthermore, the ions present in the waste brines of power plant boiler feed water can be also removed during the process, so it serves as a wastewater pretreatment and reduces the operational cost of RO and other water reuse processes. The concurrent management of multiple wastes (fly ash, brine, $CO_2$) in coal power plants has both environmental and economic benefits due to reduced burdens of acquiring and maintaining separate technologies for different waste streams.

Through the in situ synergistic management of different waste streams, this self-sustaining process demonstrates that carbon capture and utilization in coal-fired power plant can be more cost effective, which helps the industry to meet the new Clean Power Plan for existing power plants in the U.S.

As demonstrated herein, electrolytic carbonation of coal fly ash provides a novel route for self-sustaining carbon sequestration in coal-fired power plant via synergistic treatment of different waste streams on site. This process can significantly reduce cost and simplify procedure for carbon mitigation. It also brings additional benefits such as high purity $CaCO_3$ products, purified fly ash reuse as renewable materials, and saline wastewater treatment. In certain embodiments, it is a complement for traditional carbon capture and storage (CCS).

TABLE 1

Changes in ion concentration and conductivity of the anolyte and catholyte in MECC process using either artificial wastewater (AW) or produced water (PW) electrolytes. Abiotic MECC without applied voltage was conducted as control.

| Electrolyte | Samples | Status | Conductivity (mS/cm) | Ba$^{2+}$ | Sr$^{2+}$ | Ca$^{2+}$ | Mg$^{2+}$ | K$^+$ | Na$^{2+}$ | Cl$^-$ | Br$^-$ | PO$_4^{3-}$ | Si |
|---|---|---|---|---|---|---|---|---|---|---|---|---|---|
| AW | Anolyte | Initial | 10.65 | — | — | — | — | 77.9 | 2104 | 2943 | — | — | — |
|  |  | Final | 10.81 | — | — | 497.0 | 4.2 | 9.0 | 1313 | 3005 | — | — | 112.5 |
|  |  | Control | 10.68 | — | — | 97.7 | 6.4 | 76.0 | 2147 | 3025 | — | — | 21.9 |
|  | Catholyte | Initial | 8.93 | — | — | — | — | — | 1824 | 2727 | — | — | — |
|  |  | Final* | 11.58 | — | — | 4.8 | 2.5 | 69.6 | 2601 | 2794 | — | — | 1.4 |
|  |  | Final** | 11.56 | — | — | 121.2 | 2.3 | 68.7 | 2610 | 2795 | — | — | 1.7 |
| PW | Anolyte | Initial | 19.68 | 28.2 | 11.08 | 98.5 | 8.32 | 99.3 | 4854 | 6273 | 43.2 | 1.08 | 23.3 |
|  |  | Final | 20.35 | 6.4 | 4.16 | 400.3 | 6.39 | 12.9 | 4239 | 6311 | 45.4 | 0.45 | 129.2 |
|  |  | Control | 21.35 | 18.3 | 9.49 | 29.8 | 6.92 | 98.9 | 4887 | 6305 | 45.4 | 0.99 | 24.6 |
|  | Catholyte | Initial | 19.60 | 28.9 | 11.20 | 97.8 | 8.45 | 42.4 | 4660 | 6277 | 43.7 | 1.79 | 26.9 |
|  |  | Final* | 22.71 | 5.2 | 3.28 | 6.4 | 4.42 | 122.0 | 5315 | 6223 | 43.8 | 0.12 | 41.6 |
|  |  | Final** | 22.70 | 8.2 | 4.10 | 84.3 | 4.57 | 123.2 | 5387 | 6244 | 43.5 | 0.18 | 42.0 |

"—" = value not detected.
*Catholyte that has been filtered through 0.22 μm membrane to remove the suspended solid in solution for DIC testing.
**Acidified catholyte with all suspended solid in solution has been completely dissolved for TIC testing.

TABLE 2

XRD quantitative crystalline phase analyses of precipitates formed in MECC system.

| | Quantitative Phase Analysis (wt %) | |
|---|---|---|
| Crystalline phase | AW electrolyte | PW electrolyte |
| CaCO$_3$ (Calcite) | 73.5 | 9.69 |
| CaCO$_3$ (Aragonite) | 23.1 | |
| CaCO$_3$ (Vaterite) | 3.4 | |
| NaCl (Halite) | | 3.1 |

TABLE 3

A replicate experiment for changes in ion concentration and conductivity of the anolyte and catholyte in MECC process using artificial wasterwater electrolyte. Abiotic MECC without applied voltage was prepared as control.

| Samples | Status | Conductivity (mS/cm) | Ca$^{2+}$ | Mg$^{2+}$ | Na$^+$ | K$^+$ | Cl$^-$ | Si |
|---|---|---|---|---|---|---|---|---|
| Anolyte | Initial | 10.57 | 0.8 | 6.3 | 2125 | 85.7 | 3114 | 0.0 |
| | Final | 10.77 | 364.0 | 4.1 | 1618 | 27.2 | 4126 | 43.4 |
| | Control | 10.61 | 43.0 | 6.2 | 2130 | 87.1 | 3120 | 5.1 |
| Catholyte | Initial | 8.88 | 0.0 | 0.0 | 1859 | 3.9 | 2844 | 0.0 |
| | Final* | 10.80 | 4.7 | 1.5 | 2415 | 58.0 | 2881 | 0.4 |
| | Final** | 10.82 | 73.8 | 1.6 | 2418 | 58.1 | 2882 | 0.5 |

*Catholyte that has been filtered through 0.22 μm membrane to remove the suspended solid in solution for DIC testing.
**Acidified catholyte with all suspended solid in solution has been completely dissolved for TIC testing.

TABLE 4

Summary of energy expenditure and production (H$_2$ energy output) in MECC using artificial wastewater electrolyte.

| | Energy Production as H$_2$ | | | Energy Expenditure & Carbon Capture | | |
|---|---|---|---|---|---|---|
| | | AW* | PW | | AW* | PW |
| Coulombic efficiency (%) | | 82/54 | 80 | Captured carbon from organics (%) | 93/93 | 91 |
| Cathodic H$_2$ recovery (%) | | 91/95 | 95 | | | |
| Overall H$_2$ recovery (%) | | 75/52 | 76 | Captured carbon from CO$_2$ (%) | 86/78 | 80 |
| Current density (A/m$^3$) | | 81/90 | 123 | | | |
| H2 production rate (m$^3$-H$_2$/m$^3$/d) | | 0.81/0.94 | 1.29 | Energy expenditure (kJ/mol-total C/CO$_2$ captured) | 84/72 | 72 |
| Produced H$_2$ energy (kJ/mol-total C/CO$_2$ captured) | | 146/130 | 129 | | | |

Net energy gain (kJ/mol-total C/CO$_2$ captured) 62/58 (AW) and 57 (PW)
*values listed derived from a 1$^{st}$ experimental run and a 2$^{nd}$ experimental run

TABLE 5

Ion concentration changes at the beginning and end of experiment (ppm).

| | Cl | Si | Mn | Fe | Mg | Ca | Al | Na | K |
|---|---|---|---|---|---|---|---|---|---|
| Cathode initial | 2477 | 0.04 | 0.68 | ND | 0.50 | 0.005 | 0.03 | 1604 | ND |
| Cathode final | 2496 | 0.72 | 0.01 | ND | 0.089 | 23.46 | ND | 1685 | 27.0 |
| Anode initial | 2735 | ND | 0.01 | ND | ND | 0.30 | ND | 1918 | 70.7 |
| Anode final | 2505 | 74.81 | ND | 0.08 | 0.584 | 111.37 | 0.23 | 1745 | 49.2 |

(ND indicates below detection limit)

TABLE 6

Scale-up potential of wastewater CO$_2$ capture and storage.

| | Total deg.BOD (tons/year) | CO$_2$ Capture (tons/year) | Economic Values (million USD/yr) | | | | | |
|---|---|---|---|---|---|---|---|---|
| | | | California | British Columbia | Australia | France | UK | Japan |
| Domestic wastewater | 900,000 | 147,600 | 1.8 | 3.1 | 0.6 | 1.1 | 2.3 | 0.3 |
| Industrial wastewater | — | — | — | — | — | — | — | — |
| Three industries | 383,690 | 153,476 | 1.8 | 3.2 | 0.6 | 1.2 | 2.4 | 0.3 |

TABLE 6-continued

Scale-up potential of wastewater $CO_2$ capture and storage.

|  | Total deg.BOD (tons/year) | $CO_2$ Capture (tons/year) | Economic Values (million USD/yr) | | | | | |
|---|---|---|---|---|---|---|---|---|
|  |  |  | California | British Columbia | Australia | France | UK | Japan |
| All industries | 170,100,000 | 68,040,000 | 816.5 | 1428.8 | 272.2 | 520.5 | 107.16 | 136.1 |
| Total | 171,000,000 | 68,400,000 | 818.3 | 1431.9 | 272.8 | 521.6 | 107.40 | 136.4 |

TABLE 7

Changes of element composition (%) in fly ash during different operating step.

| Step | Electrolyte | Si | Al | Ca | S | Fe | K | Na | Mg |
|---|---|---|---|---|---|---|---|---|---|
| Initial |  | 21.87 | 11.85 | 8.74 | 2.77 | 1.92 | 0.93 | 0.82 | 0.68 |
| S + E (0 V) | NaCl | 21.67 | 11.96 | 7.01 | 2.91 | 1.92 | 0.83 | 1.45 | 0.64 |
| S + E (3.5 V) |  | 21.12 | 11.42 | 6.52 | 2.66 | 1.94 | 0.92 | 1.29 | 0.62 |
| S + E (0 V) | $Na_2SO_4$ | 20.60 | 11.54 | 7.71 | 4.10 | 1.85 | 0.82 | 1.39 | 0.63 |
| S + E (3.5 V) |  | 21.02 | 11.03 | 7.48 | 4.07 | 1.90 | 0.79 | 1.56 | 0.63 |

S: Stirring mixture of fly ash and electrolyte at 250 rpm for 2 hours.
E: Electrolysis of fly ash at a voltage of 3.5 V or 0 V (control) for 1 hour.

TABLE 8

XRD quantitative crystalline phase analyses of precipitates deposited after carbonation of NaCl and $Na_2SO_4$ electrolyte at the end of electrolysis.

|  | Quantitative Phase Analysis (wt %) | |
|---|---|---|
| Crystalline phase | NaCl electrolyte | $Na_2SO_4$ electrolyte |
| $CaCO_3$ (Calcite) | 97.9 | 99.6 |
| NaCl (Halite) | 2.1 | — |
| Unidentified | — | 0.4 |

TABLE 9

Changes of chemical composition in electrolyte during different operating step.

| In NaCl electrolyte (mg/L) | | | | | | | | | |
|---|---|---|---|---|---|---|---|---|---|
| Step | $Ca^{2+}$ | $Mg^{2+}$ | $K^+$ | $Na^+$ | Si | Fe | $Al^{3+}$ | Mn | Pb |
| Initial | BDL | BDL | BDL | 11580 | BDL | BDL | BDL | BDL | BDL |
| S + E (0 V) | 833 | 0.03 | 28.7 | 11670 | 1.1 | BDL | 0.31 | BDL | BDL |
| S + E (0 V) + C | 361 | 0.03 | 26.8 | 11547 | 1.2 | BDL | 0.18 | BDL | BDL |
| S + E (3.5 V) | 1103 | 0.03 | 76.4 | 11678 | 1.1 | BDL | 0.17 | BDL | BDL |
| S + E (3.5 V) + C | 281 | BDL | 73.8 | 11598 | 1.1 | BDL | BDL | BDL | BDL |

| In $Na_2SO_4$ electrolyte (mg/L) | | | | | | | | | |
|---|---|---|---|---|---|---|---|---|---|
| Step | $Ca^{2+}$ | $Mg^{2+}$ | $K^+$ | $Na^+$ | Si | Fe | $Al^{3+}$ | Mn | Pb |
| Initial | BDL | BDL | BDL | 11340 | BDL | BDL | BDL | BDL | BDL |
| S + E (0 V) | 488 | 0.09 | 10.1 | 11358 | 6.7 | 0.09 | 0.66 | BDL | BDL |
| S + E (0 V) + C | 126 | 0.05 | 16.3 | 11385 | 6.2 | BDL | 0.37 | BDL | BDL |
| S + E (3.5 V) | 627 | 0.03 | 55.3 | 11573 | 7.0 | BDL | 0.30 | BDL | BDL |
| S + E (3.5 V) + C | 157 | 0.03 | 25.6 | 11518 | 6.7 | BDL | 0.17 | BDL | BDL |

S: Stirring mixture of fly ash and electrolyte at 250 rpm for 2 hours.
E: Electrolysis of fly ash at a voltage of 3.5 V or 0 V (control) for 1 hour.
C: Carbonation of electrolyte by flushing it with 15% concentration $CO_2$.
BDL: Below detection limit.

TABLE 10

Performance, carbon benefits, and energy expenditure of electrolytic carbonation of coal fly ash

| Process | TIC (mmol/L) | Sequestration Capacity (kg-$CO_2$/t-fly ash) | Mitigation Capacity (kg-$CO_2$/t-fly ash) | Sequestration energy expenditure (kJ/mol-$CO_2$) | Mitigation energy expenditure (kJ/mol-$CO_2$) |
|---|---|---|---|---|---|
| In NaCl electrolyte | | | | | |
| S + E (0 V) + C | 11.40 | 9.75 | 12.33 | NA | NA |
| S + E (3.5 V) + C | 21.53 | 18.42 | 20.14 | 24.4 | 19.4 |
| Enhancement by electrolysis (%) | 89% | 89% | 63% | NA | NA |
| In $Na_2SO_4$ electrolyte | | | | | |
| S + E (0 V) + C | 9.10 | 7.79 | 9.82 | NA | NA |
| S + E (3.5 V) + C | 13.30 | 11.38 | 11.37 | 36.3 | 29.3 |
| Enhancement by electrolysis (%) | 46% | 46% | 16% | NA | NA |

\* Energy consumption for stirring not included;
S: Stirring mixture of fly ash and electrolyte at 250 rpm;
E: Electrolysis of fly ash at a voltage of 3.5 V or 0 V (control);
C: Carbonation of electrolyte by flushing with 15% $CO_2$;
Sequestration capacity: Direct $CO_2$ capture capacity obtained in the experiments;
Mitigation capacity: Calculated $CO_2$ capacity including broader carbon benefits of avoided emission

TABLE 11

Calculation associated with $CO_2$ mitigation

| Step | Electrolyte | Sequestration capacity (kg-$CO_2$/t-fly ash) | Avoided $CO_2$ from current $CaCO_3$ production (kg-$CO_2$/t-fly ash) | Released $CO_2$ due to electricity consumption (mg-CO2/g-fly) | Mitigation capacity (kg-$CO_2$/t-fly ash) |
|---|---|---|---|---|---|
| S + E (0 V) | NaCl | 9.75 | 2.58 | 0 | 12.33 |
| S + E (3.5 V) | | 18.42 | 4.71 | 2.99 | 20.14 |
| S + E (0 V) | $Na_2SO_4$ | 7.79 | 2.03 | 0 | 9.82 |
| S + E (3.5 V) | | 11.38 | 2.75 | 2.76 | 11.37 |

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of sequestering and fixing carbon dioxide ($CO_2$) using an electrolytic system
   wherein the method comprises:
      adding waste water comprising dissolved or particulate organic matter to an anolyte of the system;
      feeding a $CO_2$-comprising gas into a cathodic cell of the system;
      applying an external voltage to the system to sequester at least a portion of $CO_2$ from the organic matter and from the $CO_2$-comprising gas, wherein $CO_2$ from the organic matter is produced using an exoelectrogen biofilm partially grown, coated, or impregnated on an anode of the system; and
      fixing at least a portion of the sequestered $CO_2$ in the cathode;
   wherein the electrolytic system comprises:
      an anodic cell comprising an anode and an anolyte, wherein the anode is at least partially immersed in the anolyte;
      a cathodic cell comprising a cathode and a catholyte, wherein the cathode is at least partially immersed in the catholyte;
      a porous barrier that physically separates the anodic cell and the cathodic cell, wherein the anodic cell and the cathodic cell are in fluidic communication through the porous barrier;
      an external power source that is connected to the anode and the cathode through electrical conduits, wherein the external power source allows for the application of an external voltage between the anode and the cathode; and
      a first gas inlet to the cathodic cell, wherein the first gas inlet allows for (a) feeding a $CO_2$-comprising gas into the cathodic cell and/or (b) collecting a gas generated in the cathodic cell;
   wherein the anolyte comprises an aqueous electrolyte comprising a dissolved or particulate organic compound or another biodegradable substrate;
   wherein the anolyte further comprises a salt of a given cation or a solid material that releases a given cation when reacted with a weak acid, wherein the given cation is capable of forming a sparingly soluble or insoluble salt with at least one selected from the group consisting of bicarbonate and carbonate; and wherein the anode is at least partially grown, coated, or impregnated with an exoelectrogen biofilm.

2. The method of claim 1, wherein the exoelectrogen comprises a *Geobacter* bacterium or other microbium capable of extracellular electron transfer.

3. The method of claim 1, wherein the salt of the given cation is less soluble in the anolyte in the absence of the external voltage than in the presence of the external voltage.

4. The method of claim 1, wherein the given cation is a polyvalent ion.

5. The method of claim 4, wherein the given cation comprises $Ca^{2+}$, $Mg^{2+}$, or $Sr^{2+}$.

6. The method of claim 4, wherein the salt of the given cation comprises $CaSiO_3$.

7. The method of claim 1, wherein the salt of the given cation is derived from a waste material or a mineral added to the anolyte.

8. The method of claim 7, wherein the waste material or mineral comprises fly ash or olivine.

9. The method of claim 1, wherein (a) the external voltage ranges from about 0.1 V to about 3.5 V; or (b) the anode is at least partially grown, coated or impregnated with an exoelectrogen biofilm, and the external voltage ranges from about 0.2 to 0.8 V.

10. The method of claim 1, wherein application of the external voltage generates hydrogen gas in the cathode.

11. The method of claim 1, wherein application of the external voltage allows for capture of carbon dioxide in the form of a carbonate or bicarbonate salt in the catholyte, optionally wherein at least a fraction of the captured carbon dioxide is derived from the $CO_2$-comprising gas fed into the cathodic cell.

12. The method of claim 1, wherein application of the external voltage does not form chlorine gas ($Cl_2$) in the anode.

13. The method of claim 1, wherein an insoluble carbonate or bicarbonate of the given cation is formed in the catholyte.

14. The method of claim 13, wherein the insoluble carbonate or bicarbonate of the given cation is isolated in purity equal to or greater than 97%.

15. The method of claim 1, wherein the first inlet is in fluidic communication with a column comprising an anionic exchange resin.

16. The method of claim 1, wherein the porous barrier comprises a cation exchange membrane, ion exchange membrane, or other physical porous separator.

17. The method of claim 1, wherein the solid material comprises fly ash.

18. The method of claim 17, further comprising converting greater than 90% of the calcium liberated from the fly ash into $CaCO_3$ after carbon capture.

19. The method of claim 18, wherein the $CaCO_3$ has a purity of about 97.9% to about 99.6%.

* * * * *